United States Patent
Yasui et al.

(10) Patent No.: US 11,054,697 B2
(45) Date of Patent: Jul. 6, 2021

(54) LIQUID CRYSTAL DISPLAY DEVICE WITH PLURAL DISPLAY PANELS AND SURFACE IRREGULARITIES

(71) Applicants: Panasonic Liquid Crystal Display Co., Ltd., Himeji (JP); Pasona Knowledge Partner Inc., Osaka (JP)

(72) Inventors: Yoichi Yasui, Osaka (JP); Katsuhiro Kikuchi, Osaka (JP)

(73) Assignees: PANASONIC LIQUID CRYSTAL DISPLAY CO., LTD., Hyogo (JP); PASONA KNOWLEDGE PARTNER INC., Osaka (JP)

( * ) Notice: Subject to any disclaimer, the term of this patent is extended or adjusted under 35 U.S.C. 154(b) by 0 days.

(21) Appl. No.: 16/196,633

(22) Filed: Nov. 20, 2018

(65) Prior Publication Data
US 2019/0155100 A1  May 23, 2019

(30) Foreign Application Priority Data

Nov. 21, 2017 (JP) .............................. JP2017-223989
Sep. 21, 2018 (JP) .............................. JP2018-176989

(51) Int. Cl.
| G02F 1/13357 | (2006.01) |
| G02F 1/1339 | (2006.01) |
| G02F 1/1335 | (2006.01) |
| G02F 1/1347 | (2006.01) |
| G02F 1/1333 | (2006.01) |

(52) U.S. Cl.
CPC ...... *G02F 1/133606* (2013.01); *G02F 1/1339* (2013.01); *G02F 1/13471* (2013.01); *G02F 1/133342* (2021.01); *G02F 1/133504* (2013.01); *G02F 1/133528* (2013.01); *G02F 1/13336* (2013.01)

(58) Field of Classification Search
CPC combination set(s) only.
See application file for complete search history.

(56) References Cited

U.S. PATENT DOCUMENTS

| 2004/0017529 A1* | 1/2004 | Choi ............... G02B 5/3083 349/114 |
| 2005/0030727 A1 | 2/2005 | Shimura |
| 2006/0164860 A1 | 7/2006 | Muraoka et al. |
| 2006/0238484 A1* | 10/2006 | Yu ............... G02F 1/133528 345/102 |
| 2007/0002586 A1* | 1/2007 | Soh ............... G02B 6/0056 362/607 |
| 2007/0242028 A1 | 10/2007 | Kitagawa et al. |

(Continued)

FOREIGN PATENT DOCUMENTS

| JP | 2005-092192 | 4/2005 |
| JP | 2006-208535 | 8/2006 |

(Continued)

*Primary Examiner* — Lauren Nguyen
(74) *Attorney, Agent, or Firm* — Hamre, Schumann, Mueller & Larson, P.C.

(57) ABSTRACT

A liquid crystal display device includes: a first display panel including a first liquid crystal cell; and a second display panel including a second liquid crystal cell and is opposed to the first display panel. An irregularity structure having a predetermined external haze value is provided at an interface of an air layer existing between the first display panel and the second display panel.

2 Claims, 17 Drawing Sheets

(56) References Cited

U.S. PATENT DOCUMENTS

| | | | |
|---|---|---|---|
| 2008/0180586 A1 | 7/2008 | Tomizuka et al. | |
| 2009/0147186 A1 | 6/2009 | Nakai et al. | |
| 2011/0075070 A1* | 3/2011 | Kitagawa | G02F 1/133504 |
| | | | 349/64 |
| 2011/0141405 A1 | 6/2011 | Kitagawa et al. | |
| 2016/0342011 A1* | 11/2016 | Zhang | G02B 6/005 |
| 2017/0097515 A1 | 4/2017 | Bell et al. | |

FOREIGN PATENT DOCUMENTS

| | | |
|---|---|---|
| JP | 2007-310376 | 11/2007 |
| JP | 2008-083463 | 4/2008 |
| JP | 2008-233456 | 10/2008 |
| JP | 2010-164931 | 7/2010 |
| JP | 2011-076107 | 4/2011 |
| JP | 2012-243612 | 12/2012 |
| JP | 2015-059973 | 3/2015 |
| JP | 2015-191052 | 11/2015 |

\* cited by examiner

LIQUID CRYSTAL DISPLAY DEVICE WITH PLURAL DISPLAY PANELS AND SURFACE IRREGULARITIES

CROSS-REFERENCE TO RELATED APPLICATION

This application claims priority from Japanese application JP2017-223989, filed on Nov. 21, 2017 and Japanese application JP2018-176989, filed on Sep. 21, 2018. This Japanese application is incorporated herein by reference.

TECHNICAL FIELD

The present invention relates to a liquid crystal display device.

BACKGROUND

A liquid crystal display device is used as a display of a television, a monitor or the like. However, the liquid crystal display device has a contrast ratio lower than an organic electro luminescence (EL) display device.

A technique, in which two display panels overlap each other and an image is displayed on each display panel, is conventionally proposed as a technique of improving a contrast ratio of a liquid crystal display device (for example, see Unexamined Japanese Patent Publication No. 2011-076107). A color image is displayed on a front-side (observer-side) display panel in two display panels disposed back and forth, and a black-and-white image is displayed on a rear-side (backlight-side) display panel, thereby improving the contrast ratio.

SUMMARY

However, it is found that Newton's rings are generated when a plurality of display panels are stacked without being bonded together. As a result, image quality of the image displayed on the liquid crystal display device is degraded.

The present disclosure has been made to solve the problem, and an object of the present disclosure is to provide a liquid crystal display device capable of preventing the degradation of the image quality due to the generation of the Newton's rings.

To solve the above problem, a liquid crystal display device according to a present disclosure includes: a first display panel including a first liquid crystal cell; and a second display panel including a second liquid crystal cell and is opposed to the first display panel, wherein an irregularity structure having a predetermined external haze value is provided at an interface of an air layer existing between the first display panel and the second display panel.

DETAILED DESCRIPTION

The following describes an exemplary embodiment of the present disclosure. The embodiment described below is merely one specific example of the present disclosure. The numerical values, shapes, materials, elements, and arrangement and connection of the elements, etc. indicated in the following embodiment are given merely by way of illustration and are not intended to limit the present disclosure. Therefore, among elements in the following embodiment, those not recited in any one of the independent claims defining the broadest inventive concept of the present disclosure are described as optional elements.

Note that the figures are schematic illustrations and are not necessarily precise depictions. Accordingly, the figures are not necessarily to scale. Moreover, in the figures, elements that are essentially the same share like reference signs. Accordingly, duplicate description is omitted or simplified.

First Exemplary Embodiment

Figure 1:
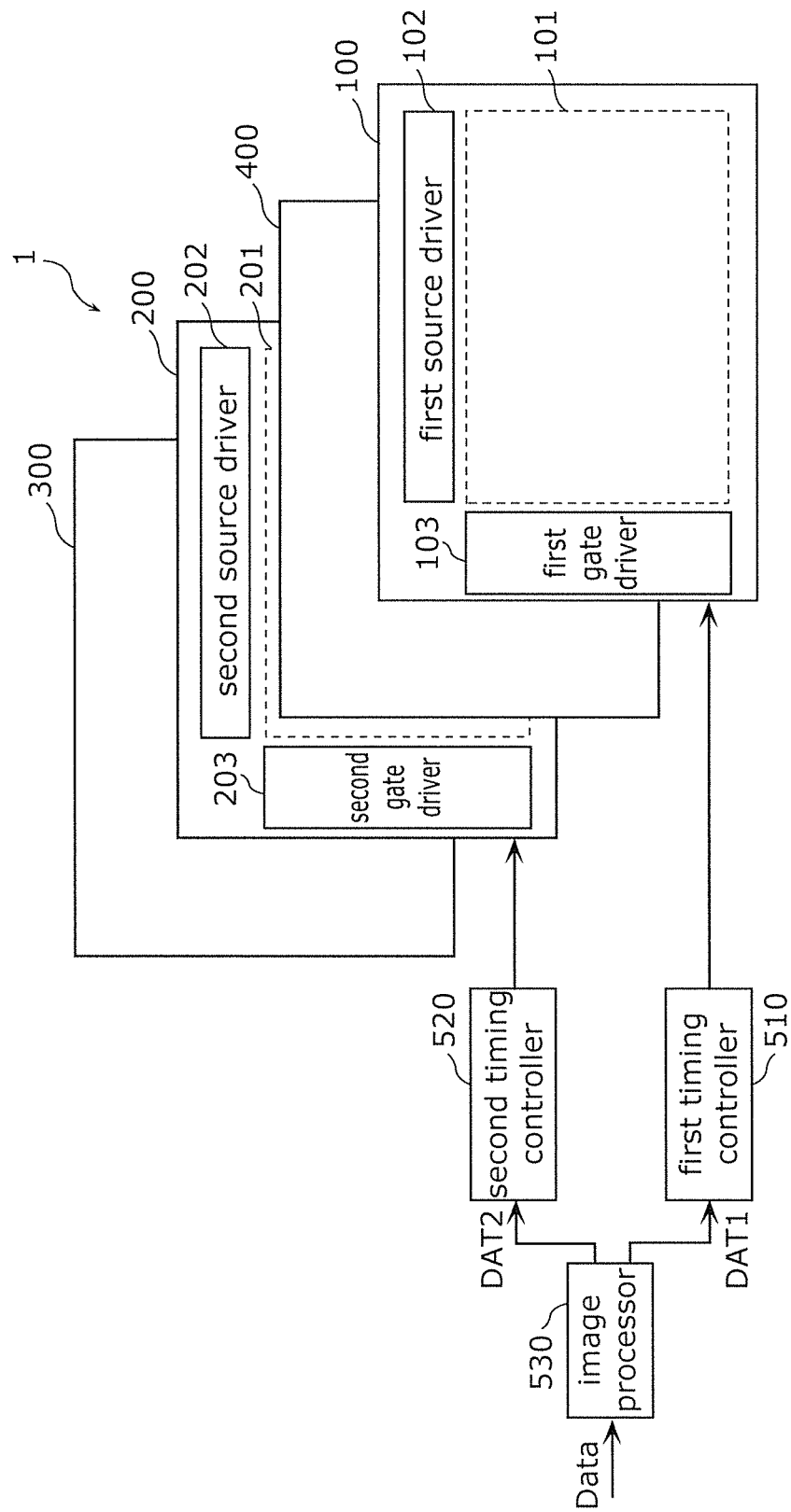
FIG. 1 is a view illustrating a schematic configuration of a liquid display device according to a first exemplary embodiment.

Liquid crystal display device 1 according to a first exemplary embodiment will be described below with reference to FIG. 1. FIG. 1 is a view illustrating a schematic configuration of liquid crystal display device 1 of the first exemplary embodiment.

Liquid crystal display device 1 is an example of an image display device configured by superimposing a plurality of display panels each of which includes a liquid crystal cell, and displays an image (video) of a still image or a moving image.

As illustrated in FIG. 1, liquid crystal display device 1 of the first exemplary embodiment includes first display panel 100 disposed at a position (front side) close to an observer, second display panel 200 disposed at a position (rear side) far from the observer with respect to first display panel 100, backlight 300 disposed on the rear side of second display panel 200, and optical member 400 disposed between first display panel 100 and second display panel 200.

First display panel 100 is a main panel that displays an image visually recognized by a user. In the first exemplary embodiment, first display panel 100 displays a color image. First source driver 102 and first gate driver 103 are provided in first display panel 100 in order to display the color image corresponding to an input video signal on first image display region 101 (active region).

Second display panel 200 is a sub-panel disposed on a back surface side of first display panel 100. In the first exemplary embodiment, second display panel 200 displays a monochrome image (black-and-white image) of an image corresponding to the color image displayed on first display panel 100 in synchronization with the color image. Second source driver 202 and second gate driver 203 are provided on second display panel 200 in order to display a monochrome image corresponding to the input video signal on second image display region 201.

First image display region 101 and second image display region 201 include a plurality of pixels arranged in a matrix form. A number of pixels in first image display region 101 and a number of pixels in second image display region 201 may be equal to or different from each other, but the number of pixels of first image display region 101 in first display panel 100 is preferably larger than the number of pixels of second image display region 201 in second display panel 200 that is the sub-panel.

For example, a driving system of first display panel 100 and second display panel 200 are a lateral electric field system such as an IPS (In-Plane Switching) system and an FFS (Fringe Field Switching) system. However, the driving system is not limited to the lateral electric field system, but may be a VA (Vertical Alignment) system or a TN (Twisted Nematic) system.

Backlight 300 emits light toward first display panel 100 and second display panel 200. The light emitted from backlight 300 is transmitted through second display panel 200 and then transmitted through first display panel 100. In the first exemplary embodiment, optical member 400 is disposed between first display panel 100 and second display panel 200, so that the light emitted from backlight 300 is transmitted through second display panel 200, transmitted through optical member 400, and then transmitted through first display panel 100.

Backlight 300 is a surface light source unit that emits planar, uniform diffused light (scattered light). For example, backlight 300 is a Light Emitting Diode (LED) backlight in which an LED is used as a light source. However, backlight 300 is not limited to the LED backlight. In the first exemplary embodiment, backlight 300 is a direct-under type backlight, and the plurality of LEDs are two-dimensionally arranged.

Backlight 300 is not limited to the direct type, but may be an edge type. Backlight 300 may include an optical sheet such as a diffusion sheet (diffusion plate) that diffuses the light from the light source and a prism sheet that controls light distribution.

Optical member 400 provides an optical property to the light transmitted through optical member 400. Specifically, optical member 400 has a light diffusing property of diffusing (scattering) the light from backlight 300. In the first exemplary embodiment, optical member 400 is disposed between first display panel 100 and second display panel 200, so that optical member 400 diffuses the light transmitted through second display panel 200 from backlight 300.

Optical member 400 is bonded to at least one of the surface of first display panel 100 on the side of second display panel 200 and the surface of second display panel 200 on the side of first display panel 100. Details of optical member 400 will be described later.

Liquid crystal display device 1 also includes first timing controller 510 that controls first source driver 102 and first gate driver 103 of first display panel 100, second timing controller 520 that controls second source driver 202 and second gate driver 203 of second display panel 200, and image processor 530 that outputs image data to first timing controller 510 and second timing controller 520.

Image processor 530 receives input video signal Data sent from an external system, performs image processing on input video signal Data, outputs first image data DAT1 to first timing controller 510, and outputs second image data DAT2 to second timing controller 520. Image processor 530 also outputs a control signal such as a synchronous signal to first timing controller 510 and second timing controller 520. First image data DAT1 is image data used to display the color image, and second image data DAT2 is image data used to display the monochrome image.

In liquid crystal display device 1 of the first exemplary embodiment, the image is displayed while two display panels of first display panel 100 and second display panel 200 are superimposed on each other, so that black can be tightened. Consequently, the image having a high contrast ratio can be displayed.

For example, liquid crystal display device 1 is an HDR (High Dynamic Range) compatible television. In liquid crystal display device 1, a color image having high contrast ratio and high image quality can be displayed using a backlight capable of performing local dimming control as backlight 300.

Figure 2:
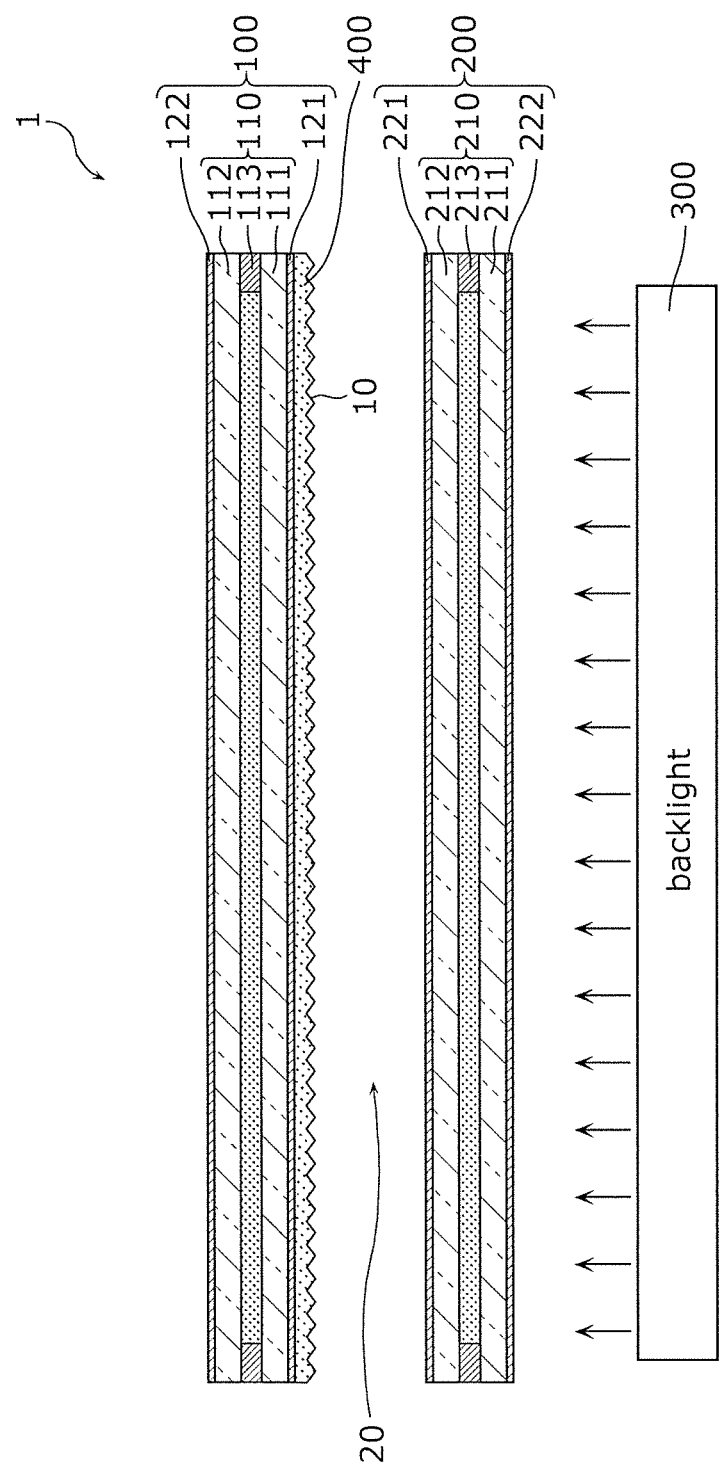
FIG. 2 is a sectional view illustrating a configuration of the liquid crystal display device of the first exemplary embodiment.

Liquid crystal display device 1 of the first exemplary embodiment will be described below with reference to FIG. 2. FIG. 2 is a sectional view illustrating a configuration of liquid crystal display device 1 of the first exemplary embodiment.

In the liquid crystal display device 1, first display panel 100 and second display panel 200 are disposed with air layer 20 interposed therebetween. That is, first display panel 100 and second display panel 200 are disposed while separated from each other without being bonded together using a bonding member such as an adhesive sheet and a bonding agent. For example, first display panel 100 and second display panel 200 are held together with backlight 300 by a holding member (a frame or a chassis) made of metal or resin.

As illustrated in FIG. 2, liquid crystal display device 1 includes first display panel 100 and second display panel 200 as a liquid crystal module. First display panel 100 and second display panel 200 are disposed opposite each other.

First display panel 100 and second display panel 200 are a liquid crystal display panel including a liquid crystal cell. Specifically, first display panel 100 includes first liquid crystal cell 110 and a pair of first polarizing plates 121 and 122 between which first liquid crystal cell 110 is sandwiched. Second display panel 200 includes second liquid crystal cell 210 and a pair of second polarizing plates 221 and 222 between which second liquid crystal cell 210 is sandwiched.

First liquid crystal cell 110 includes first TFT (Thin Film Transistor) substrate 111, first counter substrate 112 opposed to first TFT substrate 111, and first liquid crystal layer 113 disposed between first TFT substrate 111 and first counter substrate 112. In the first exemplary embodiment, first liquid crystal cell 110 is disposed such that first counter substrate 112 is located in front (observer side) of first TFT substrate 111.

First TFT substrate 111 is a substrate in which a TFT layer (not illustrated) is formed on a transparent substrate such as a glass substrate. TFTs provided corresponding to each of the pixels arranged in a matrix form and wiring used to supply voltage to the TFT are formed in the TFT layer. A pixel electrode used to apply voltage to first liquid crystal layer 113 is formed on a planarization layer of the TFT layer. In the first exemplary embodiment, first liquid crystal cell 110 is driven by the lateral electric field method, so that a common electrode opposed to a pixel electrode is also formed on first TFT substrate 111.

First counter substrate 112 is a color filter (CF) substrate in which a color filter layer as a pixel formation layer is formed on a transparent substrate such as a glass substrate. A pixel formation layer of first counter substrate 112 includes a black matrix in which a plurality of openings are formed in a matrix form and a plurality of color filters formed in the openings of the black matrix. The plurality of color filters are a color filter for red, a color filter for green, or a color filter for blue, and are formed corresponding to each pixel.

First liquid crystal layer 113 is sealed between first TFT substrate 111 and first counter substrate 112. For example, first liquid crystal layer 113 is sealed by forming a sealing member into a frame shape along outer peripheral ends of first TFT substrate 111 and first counter substrate 112. The liquid crystal material of first liquid crystal layer 113 can be appropriately selected according to the driving system.

In the pair of first polarizing plates 121 and 122 between which first liquid crystal cell 110 is sandwiched, first polarizing plate 121 is bonded to the surface on the back surface side (the side of second display panel 200) of first liquid crystal cell 110, and first polarizing plate 122 is bonded to the surface on the front surface side (observer side) of first liquid crystal cell 110. Specifically, first polarizing plate 121 is bonded to the outer surface of first TFT substrate 111 of first liquid crystal cell 110. On the other hand, first polarizing plate 122 is bonded to the outer surface of first counter substrate 112 of first liquid crystal cell 110.

The pair of first polarizing plates 121 and 122 is disposed such that polarization axes of first polarizing plates 121 and 122 are orthogonal to each other. First polarizing plates 121 and 122 are disposed such that a crossed Nicol positional relationship holds.

Second liquid crystal cell 210 includes second TFT substrate 211, second counter substrate 212 opposed to second TFT substrate 211, and second liquid crystal layer 213 disposed between second TFT substrate 211 and second counter substrate 212. In the first exemplary embodiment, second liquid crystal cell 210 is disposed such that second counter substrate 212 is located in front of second TFT substrate 211. Second liquid crystal cell 210 is disposed such that second TFT substrate 211 is located in front of second counter substrate 212.

Second TFT substrate 211 has the same configuration as first TFT substrate 111, and is a substrate in which a TFT layer (not illustrated) is formed on a transparent substrate such as a glass substrate. The pixel electrode for applying voltage to the second liquid crystal layer 213 and the common electrode opposed to the pixel electrode are formed on the second TFT substrate 211.

Second counter substrate 212 is a substrate in which a pixel formation layer is formed on a transparent substrate such as a glass substrate. The pixel formation layer of second counter substrate 212 includes the black matrix in which the plurality of openings are formed in a matrix form. In the first exemplary embodiment, since second display panel 200 displays a monochrome image, the color filter is not formed in the pixel formation layer of second counter substrate 212.

Second liquid crystal layer 213 is sealed between second TFT substrate 211 and second counter substrate 212. For example, second liquid crystal layer 213 is sealed by forming the sealing member into the frame shape along outer peripheral ends of second TFT substrate 211 and second counter substrate 212. The liquid crystal material of second liquid crystal layer 213 can be appropriately selected according to the driving system.

In the pair of second polarizing plates 221 and 222 between which second liquid crystal cell 210 is sandwiched, second polarizing plate 221 is bonded to the surface on the front surface side (the side of first display panel 100) of second liquid crystal cell 210, and second polarizing plate 222 is bonded to the surface on the back surface side (the side of backlight 300) of second liquid crystal cell 210. Specifically, second polarizing plate 221 is bonded to the outer surface of second counter substrate 212 of second liquid crystal cell 210. On the other hand, second polarizing plate 222 is bonded to the outer surface of second TFT substrate 211 of second liquid crystal cell 210.

The pair of second polarizing plates 221 and 222 is disposed such that the polarization axes of second polarizing plates 221 and 222 are orthogonal to each other. Second polarizing plates 221 and 222 are disposed such that the crossed Nicol positional relationship holds.

In the liquid crystal display device 1, irregularity structure 10 having a predetermined external haze value is provided at an interface of air layer 20 existing between first display panel 100 and second display panel 200. Specifically, irregularity structure 10 is provided at the interface of air layer 20 on the side of first display panel 100. In the first exemplary embodiment, irregularity structure 10 is provided as a surface structure of optical member 400.

Optical member 400 is a sheet-shaped optical sheet or a film-shaped optical film, and is bonded to the surface of first display panel 100 on the side of second display panel 200. For example, optical member 400 is bonded to the surface of first polarizing plate 121 of first display panel 100 with an adhesive layer interposed therebetween.

Irregularity structure 10 of optical member 400 is a minute surface irregularity structure (external haze structure) in which a minute protrusion and a minute recess are repeatedly arranged, and has the light diffusing property of diffusing the light at the interface with air layer 20. The sizes of the protrusion and recess of irregularity structure 10 are not particularly limited as long as irregularity structure 10 has the light diffusing property, but are, for example, a millimeter order size, a micrometer order size, or a nanometer order size.

Figure 3:
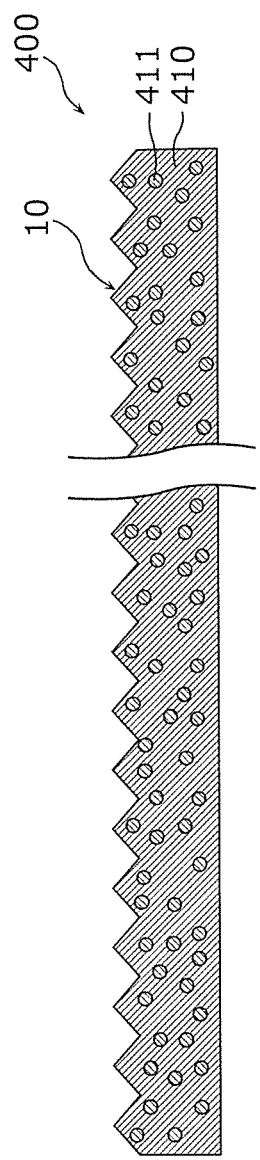
FIG. 3 is a partially sectional view illustrating an optical member of the liquid crystal display device of the first exemplary embodiment.

FIG. 3 is a view illustrating an example of optical member 400. As illustrated in FIG. 3, for example, optical member 400 has a configuration in which irregularity structure 10 is formed on the surface of base material layer 410 having translucency. Base material layer 410 is made of a transparent resin material such as PET (polyethylene terephthalate).

For example, optical member 400 having irregularity structure 10 can be formed by subjecting a flat plate-shaped base material layer 410 to physical embossing, optical embossing by UV light or the like, or nanoimprinting processing. Optical member 400 having irregularity structure 10 can also be formed by resin molding using a metal mold.

In the first exemplary embodiment, a plurality of light diffusing materials 411 are dispersed in base material layer 410. For example, light diffusing material 411 is a light diffusing fine particle. Light diffusing material 411 may diffuse the light by a difference in refractive index between light diffusing material 411 and base material layer 410, or may diffuse the light by scattering reflection of the light. In the case where the light is diffused by the difference in refractive index, for example, light diffusing material 411 is a light diffusing fine particle such as a translucent fine particle made of a resin material and an air particle (air bubble). In the case where the light is diffused by the scattering reflection, for example, light diffusing material 411 is a light diffusing fine particle such as a filler or a white fine particle made of an inorganic material and a metal fine particle.

As described above, optical member 400 of the first exemplary embodiment includes base material layer 410 in which light diffusing material 411 is dispersed as the light diffusing layer having the predetermined internal haze value. That is, optical member 400 has not only the light diffusing property by irregularity structure 10 (external haze structure) but also the light diffusing property by base material layer 410 (internal haze structure) containing light diffusing material 411.

In optical member 400, the external haze value by irregularity structure 10 is preferably smaller than the internal haze value by base material layer 410 (light diffusing layer). Specifically, in optical member 400, the external haze value is less than 50% and the internal haze value is greater than or equal to 50%. As an example, the external haze value ranges from 20% to 25%, and the internal haze value is 80%. For example, the external haze value by irregularity structure 10 can be adjusted by changing a shape or a size of irregularity structure 10, and the internal haze value by base material layer 410 (light diffusing layer) can be adjusted by appropriately selecting the refractive index of light diffusing material 411 and the refractive index of base material layer 410 or by changing a content ratio of light diffusing material 411.

For example, the external haze value and internal haze value of optical member 400 can be measured as follows.

First, optical member 400 is irradiated with the light while irregularity structure 10 is exposed to air, and the haze value of whole optical member 400 is measured based on an amount of light before and after the transmission through optical member 400. At this point, the haze value is the total haze value obtained by adding the external haze value by irregularity structure 10 and the internal haze value by base material layer 410 (light diffusing layer).

Subsequently, a substance having the same refractive index as that of the layer to which irregularity structure 10 is provided is applied to the surface of optical member 400 on the side of irregularity structure 10 to remove irregularity structure 10. At this point, optical member 400 is irradiated with the light, and the haze value of optical member 400 is measured based on the amount of light before and after the transmission through optical member 400. In this case, since the light diffusing property by irregularity structure 10 can be eliminated by bonding the substrate, the haze value at this time becomes the haze value only by the light diffusing property of base material layer 410 (light diffusing layer), namely, the internal haze value.

The external haze value can be calculated from a difference between the initially-measured total haze value and the later-measured internal haze value.

Figure 4:
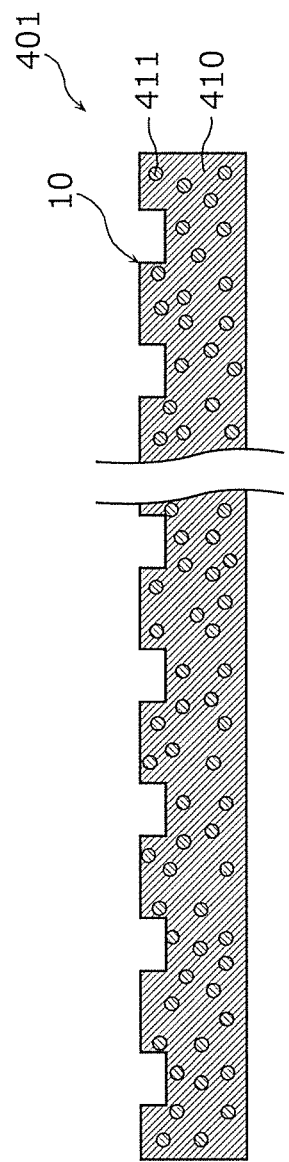
FIG. 4 is a partially sectional view illustrating a first variation of the optical member of the liquid crystal display device of the first exemplary embodiment.
Figure 5:
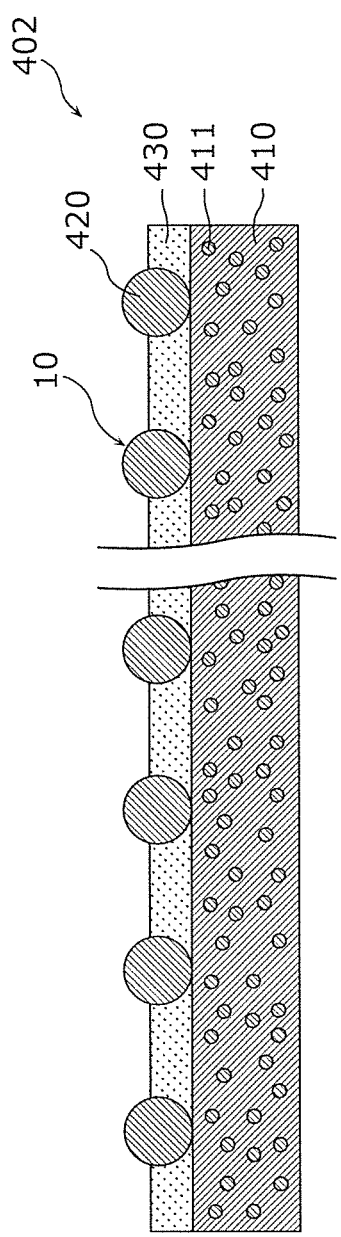
FIG. 5 is a partially sectional view illustrating a second variation of the optical member of the liquid crystal display device of the first exemplary embodiment.

Optical member 400 including irregularity structure 10 is not limited to the structure in FIG. 3. For example, in optical member 400 of FIG. 3, the protrusion and the recess have the triangular shape in section. Alternatively, as in optical member 401 of FIG. 4, the protrusion and the recess may have a rectangular shape in section. Further, as in optical member 402 of FIG. 5, particles (beads) 420 made of a resin material such as an acrylic resin, a metal material, or a glass material are dispersed on flat plate-shaped base material layer 410, and particles 420 may be fixed to base material layer 410 with binder 430 by applying binder 430 in the state in which the irregularity due to particles 420 remains.

The action of liquid crystal display device 1 of the first exemplary embodiment will be described below while circumstances leading to the present disclosure are included.

As described above, the two display panels are superimposed on each other, the color image is displayed on one of the display panels, and the black-and-white image is displayed on the other display panel, which allows the improvement of the contrast ratio. For example, in the case where one of the display panels has the contrast ratio of 1000:1 or more, the high contrast ratio of 1 million:1 or more can be provided by superimposing the two display panels on each other.

In the case where the liquid crystal display device is constructed with the two display panels, conventionally, the two display panels are usually bonded together. That is, the two display panels are fixed to each other by a bonding agent or the like.

However, it is found that, when the two display panels were stacked without being bonded, a place where the two display panels are in contact with each other and a place where a gap exists without contact are generated, and the phenomenon called the Newton's rings are generated at the place where the two display panels are in contact with each other and within the range where minute gaps exist in the vicinity of the place. The Newton's rings are a phenomenon in which interference of light is generated by the generation of a phase shift due to fixed end reflection or a change in optical path length by reflection in the case where an interface, such as the air layer, in which the refractive index changes largely, exists between the two display panels. When the Newton's rings are generated, the image quality of the image displayed on the liquid crystal display device is degraded.

As described above, the inventor of the present disclosure has found that the Newton's rings are generated by the generation of the air layer when the two display panels are not bonded together, but stacked.

As a result of intensive investigation on the problem, the inventor of the present disclosure has found that the Newton's rings generated when the two display panels are stacked without being bonded together can be prevented by providing the irregularity structure having a predetermined external haze value at the interface of the air layer existing between the two display panels, specifically, the interface between the air layer and at least one of the two display panels.

Specifically, in liquid crystal display device 1 of the first exemplary embodiment, irregularity structure 10 having the predetermined external haze value is provided at the interface of air layer 20 existing between first display panel 100 and second display panel 200.

Consequently, even if air layer 20 exists between first display panel 100 and second display panel 200, the generation of the Newton's rings can effectively be prevented by stacking first display panel 100 and second display panel 200 without bonding first display panel 100 and second display panel 200. Thus, the degradation of the image quality of the image displayed on liquid crystal display device 1 can be prevented.

In liquid crystal display device 1 of the first exemplary embodiment, first display panel 100 and second display panel 200 are not bonded together. That is, first display panel 100 and second display panel 200 are stacked without using a bonding agent. This enables liquid crystal display device 1 to be manufactured at low cost.

In liquid crystal display device 1 of the first exemplary embodiment, irregularity structure 10 is provided as a surface structure of optical member 400 disposed between first display panel 100 and second display panel 200.

Consequently, the generation of the Newton's rings can be prevented by simply inserting optical member 400 including irregularity structure 10 between first display panel 100 and second display panel 200.

In this case, optical member 400 may be bonded to at least one of the surface of first display panel 100 on the side of second display panel 200 and the surface of second display panel 200 on the side of first display panel 100.

Consequently, air layer 20 between first display panel 100 and second display panel 200 becomes one layer, so that the generation of the Newton's rings can further be prevented.

In liquid crystal display device 1 of the first exemplary embodiment, optical member 400 includes base material layer 410 containing light diffusing material 411 as the light diffusing layer having the predetermined internal haze value.

As a result, moire generated when first display panel 100 and second display panel 200 are superimposed on each other is prevented, so that the degradation of the image quality of liquid crystal display device 1 can further be prevented. That is, the lattice-shaped or line-shaped black matrices for forming pixels are formed in first display panel 100 and second display panel 200. However, when first display panel 100 and second display panel 200 are stacked, the moire (bright and dark pattern) depending on a pixel pitch is generated by the black matrices of first display panel 100 and second display panel 200. This degrades the image quality of the image displayed on first display panel 100 on the observer side. For this reason, by inserting the light diffusing layer between first display panel 100 and second display panel 200, the light output from second display panel 200 can be diffused by the light diffusing layer. Consequently, the light incident on first display panel 100 can spatially be mixed, so that the generation of the moire can be prevented. Thus, the degradation of the image quality due to the moire can be prevented.

In liquid crystal display device 1 of the first exemplary embodiment, optical member 400 including the light diffusing layer is bonded to the surface of first display panel 100 on the side of second display panel 200.

This enables a distance between optical member 400 and backlight 300 to be increased as compared with the case of bonding optical member 400 to second display panel 200. In this case, because the gap can widely be secured between optical member 400 including the light diffusing layer and the black matrix of second display panel 200, after the light transmitted through the black matrix of second display panel 200 spreads sufficiently, the light enters optical member 400, and the light transmitted through second display panel 200 is sufficiently spatially mixed by optical member 400. For this reason, the generation of the moire can further be prevented, so that the degradation of the image quality can further be prevented.

In optical member 400 of the first exemplary embodiment, the external haze value is smaller than the internal haze value. In this case, for example, the external haze value is less than 50% and the internal haze value is greater than or equal to 50%.

Consequently, the generation of the Newton's rings can be prevented while the generation of the moire is effectively prevented. Thus, both the prevention of the generation of the moire and the prevention of the generation of the Newton's rings can be achieved, so that high-quality liquid crystal display device 1 can be constructed.

First Modification of First Exemplary Embodiment

Figure 6:
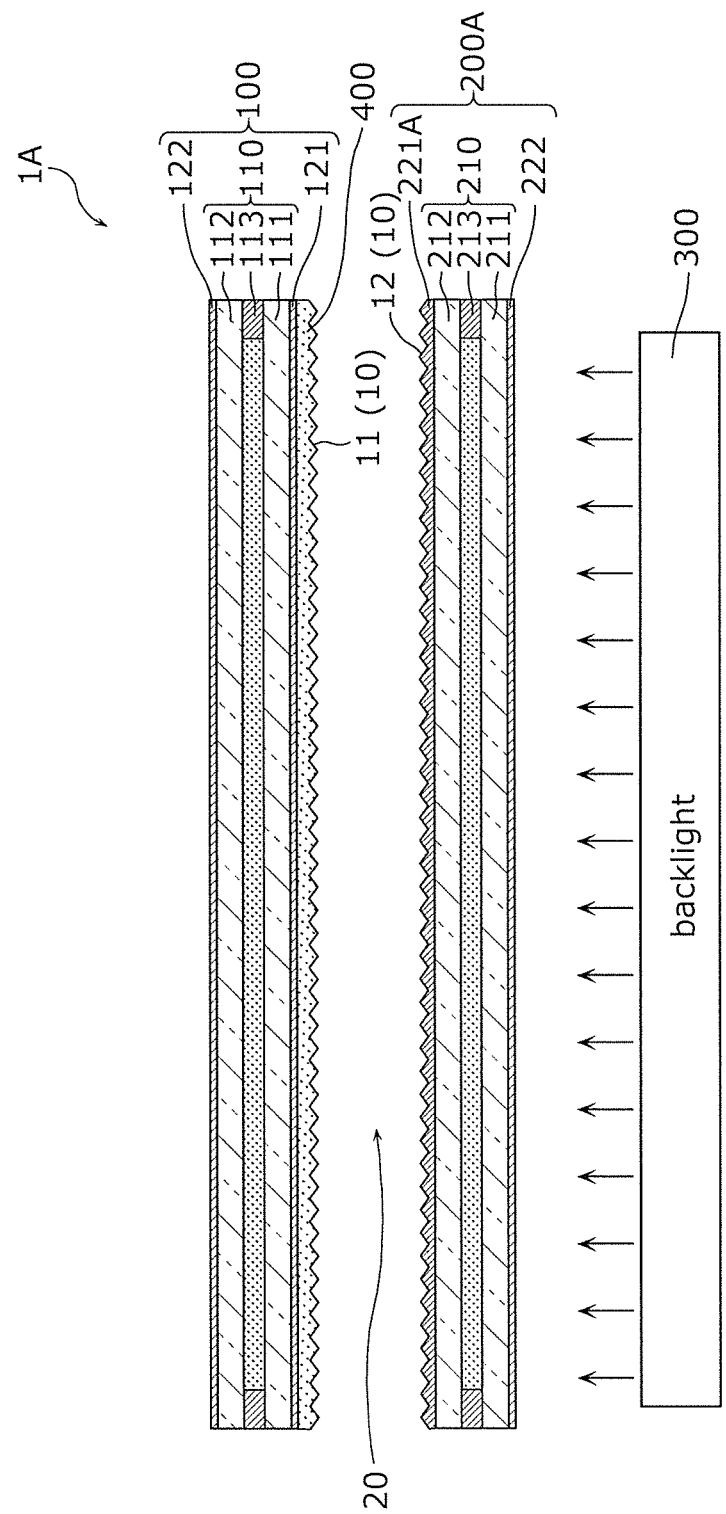
FIG. 6 is a sectional view illustrating a first variation of the liquid crystal display device of the first exemplary embodiment.

FIG. 6 is a sectional view illustrating liquid crystal display device 1A according to a first modification of the first exemplary embodiment.

As illustrated in FIG. 6, liquid crystal display device 1A of the first modification includes irregularity structure 10 on the side of second display panel 200A as compared with liquid crystal display device 1 in FIG. 2. That is, liquid crystal display device 1A of the first modification has two external haze structures of irregularity structure 10 (first irregularity structure 11) on the side of first display panel 100 and irregularity structure 10 (second irregularity structure 12) on the side of second display panel 200A.

In the first modification, first irregularity structure 11 is irregularity structure 10 provided as the surface structure of optical member 400 similarly to liquid crystal display device 1 of the first exemplary embodiment.

On the other hand, second irregularity structure 12 is irregularity structure 10 provided as the surface structure of the surface of second display panel 200A on the side of first display panel 100. As an example, second display panel 200A is a liquid crystal display panel with AG (Anti-Glare) function having a surface structure subjected to AG treatment as second irregularity structure 12.

Specifically, second irregularity structure 12 can be provided as the surface structure of second polarizing plate 221A on the side of first display panel 100 in a pair of second polarizing plates 221A and 222. As an example, a polarizing plate with AG function subjected to the AG treatment can be used as second polarizing plate 221A including second irregularity structure 12.

As described above, liquid crystal display device 1A of the first modification further includes the external haze structure on the side of second display panel 200A in addition to the internal haze structure and the external haze structure of optical member 400 on the side of first display panel 100. That is, liquid crystal display device 1A of the first modification has one internal haze structure and two external haze structures. The two external haze structures exist at both interfaces of air layer 20. In the first modification, irregularity structure 10 is provided at each of the interface of air layer 20 on the side of first display panel 100 (specifically, the interface between air layer 20 and optical member 400) and the interface of air layer 20 on the side of second display panel 200A (specifically, the interface between air layer 20 and second display panel 200A).

Consequently, the generation of the Newton's rings can further be prevented as compared with liquid crystal display device 1 of the first exemplary embodiment while the generation of the moire is effectively prevented. Thus, the degradation of the image quality of the image displayed on liquid crystal display device 1A can further be prevented.

In the first modification, assuming that Ho1 is the external haze value of the external haze structure (first irregularity structure 11) of optical member 400, that Ho2 is the external haze value of the external haze structure (second irregularity structure 12) provided in second display panel 200A, and that Hi is the internal haze value of the internal haze structure of optical member 400, a relational expression Ho2≤Ho1<Hi may be satisfied. That is, the internal haze value is maximized, and the external haze value is increased closer to the observer side.

This enables the generation of the moire and the generation of the Newton's rings to be effectively prevented. In this case, the distance from the black matrix of second display panel 200A can widely be secured as the internal haze value and the external haze value are increased. For this reason, as the internal haze value and the external haze value are increased, the light transmitted through the black matrix of second display panel 200A is incident after sufficiently spreading, and the light transmitted through second display panel 200A can sufficiently be diffused. For example, preferably the external haze values of first irregularity structure 11 and second irregularity structure 12 are less than 50%, and the internal haze value is greater than or equal to 50%. As an example, the external haze values of first irregularity structure 11 and second irregularity structure 12 range from 20% to 25%, and the internal haze value is 80%. A relational expression of Ho2<Ho1<Hi may be satisfied.

As in liquid crystal display device 1A of the first modification, not only irregularity structure 10 is provided on the side of first display panel 100, but also irregularity structure 10 is provided on the side of second display panel 200A, which allows the surfaces of both first display panel 100 on which optical member 400 is provided and second display panel 200A to be prevented from being scratched during handling.

Second Modification of First Exemplary Embodiment

Figure 7:
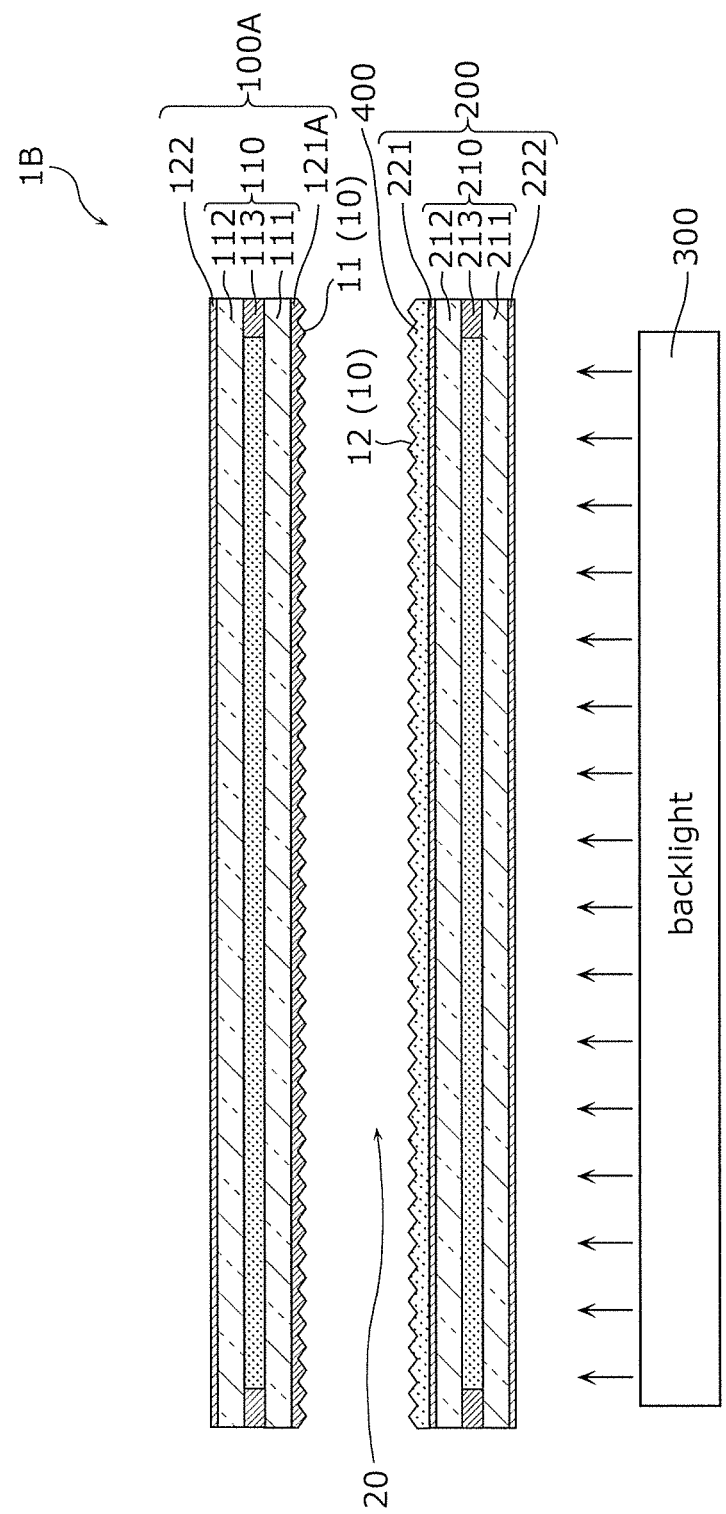
FIG. 7 is a sectional view illustrating a second variation of the liquid crystal display device of the first exemplary embodiment.

FIG. 7 is a sectional view illustrating liquid crystal display device 1B according to a second modification of the first exemplary embodiment.

As illustrated in FIG. 7, liquid crystal display device 1B of the second modification includes two external haze structures of first irregularity structure 11 and second irregularity structure 12 as irregularity structure 10 similarly to liquid crystal display device 1A in FIG. 6.

As illustrated in FIG. 7, in the liquid crystal display device 1B of the second modification, optical member 400 including irregularity structure 10 is bonded not to first display panel 100A, but to second display panel 200.

In the second modification, first irregularity structure 11 is irregularity structure 10 provided as the surface structure of the surface of first display panel 100A on the side of second display panel 200. Second irregularity structure 12 is irregularity structure 10 provided as the surface structure of optical member 400 bonded to second display panel 200.

In the second modification, first display panel 100A is a liquid crystal display panel with AG function having a surface structure subjected to the AG treatment as first irregularity structure 11.

Specifically, first irregularity structure 11 can be provided as the surface structure of first polarizing plate 121A on the side of second display panel 200A in a pair of first polarizing plates 121A and 122. As an example, a polarizing plate with AG function subjected to the AG treatment can be used as first polarizing plate 121A including first irregularity structure 11.

The same display panel as second display panel 200A including second irregularity structure 12 in FIG. 6 may be used as first display panel 100A including first irregularity structure 11, but a display panel different from second display panel 200A may be used.

As described above, liquid crystal display device 1B of the second modification includes one internal haze structure and two external haze structures similarly to liquid crystal display device 1A (FIG. 6) of the first modification, and the two external haze structures exist at both interfaces of air layer 20.

Similarly to liquid crystal display device 1A of the first modification, the generation of the Newton's rings can further be prevented while the generation of the moire is effectively prevented as compared with liquid crystal display device 1 of the first exemplary embodiment. Thus, the degradation of the image quality of the image displayed on liquid crystal display device 1B can further be prevented.

In the second modification, assuming that Ho1 is the external haze value of the external haze structure (first irregularity structure 11) provided in first display panel 100A, that Hi is the internal haze value of the internal haze structure of optical member 400, and that Ho2 is the external haze value of the external haze structure (second irregularity structure 12) of optical member 400, a relational expression of Ho2≤Ho1<Hi is satisfied similarly to liquid crystal display device 1A of the first modification. This enables the generation of the moire and the generation of the Newton's rings to be effectively prevented. A relational expression of Ho2<Ho1<Hi may be satisfied.

Additionally, in liquid crystal display device 1B of the second modification, irregularity structure 10 is provided on both the sides of first display panel 100A and second display panel 200, so that the surfaces of first display panel 100A and second display panel 200 on which optical member 400 is provided can be prevented from being scratched during handling.

Third Modification of First Exemplary Embodiment

Figure 8:
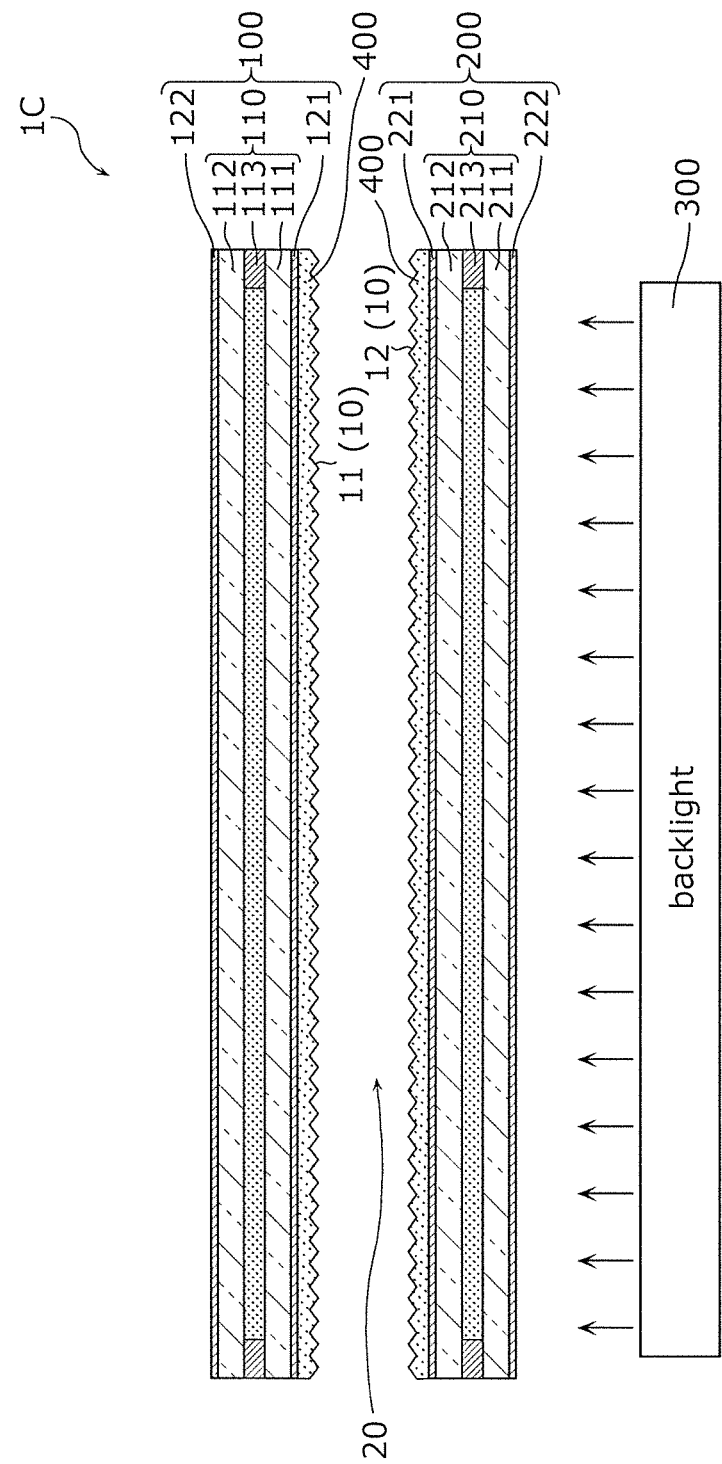
FIG. 8 is a sectional view illustrating a third variation of the liquid crystal display device of the first exemplary embodiment.

FIG. 8 is a sectional view illustrating liquid crystal display device 1C according to a third modification of the first exemplary embodiment;

As illustrated in FIG. 8, in liquid crystal display device 1C of the third modification, optical member 400 is also provided on second display panel 200 with respect to liquid crystal display device 1 in FIG. 2. That is, in liquid crystal display device 1C of the third modification, optical member 400 including irregularity structure 10 is bonded not only to first display panel 100 but also to second display panel 200.

Thus, in liquid crystal display device 1C of the third modification, the external haze structure (first irregularity structure 11) and the internal haze structure exist on the side of first display panel 100 with air layer 20 interposed therebetween, and the external haze structure (second irregularity structure 12) and the internal haze structure exist on the side of second display panel 200. That is, liquid crystal display device 1C of the third modification includes two external haze structures and two internal haze structures.

Optical member 400 provided in first display panel 100 and optical member 400 provided in second display panel 200 may have the same external haze value or different external haze values.

As described above, liquid crystal display device 1C of the third modification includes the two internal haze structures and the two external haze structures, and the two external haze structures exist at both the interfaces of air layer 20.

Consequently, as compared to liquid crystal display device 1 of the first exemplary embodiment, the generation of the Newton's rings can further be prevented while the generation of the moire is further prevented. Thus, the degradation of the image quality of the image displayed on liquid crystal display device 1C can further be prevented.

In the third modification, assuming that Hi1 and Ho1 are the internal haze value of the internal haze structure and the external haze value of the external haze structure (first irregularity structure 11) with respect to optical member 400 (first optical member) provided in first display panel 100, respectively, and that Hi2 and Ho2 are the internal haze value of the internal haze structure and the external haze value of the external haze structure (second irregularity structure 12) with respect to optical member 400 (second optical member) provided in second display panel 200, respectively, a relational expression Ho2≤Ho1<Hi2≤Hi1 is satisfied. This enables the generation of the moire and the generation of the Newton's rings to be effectively prevented. A relational expression of Ho2<Ho1<Hi2<Hi1 may be satisfied.

Additionally, in liquid crystal display device 1C of the third modification, irregularity structure 10 is provided on both the sides of first display panel 100 and second display panel 200, so that surfaces of first display panel 100 provided with optical member 400 and second display panel 200 provided with optical member 400 can be prevented from being scratched during handling.

Fourth Modification of First Exemplary Embodiment

Figure 9:
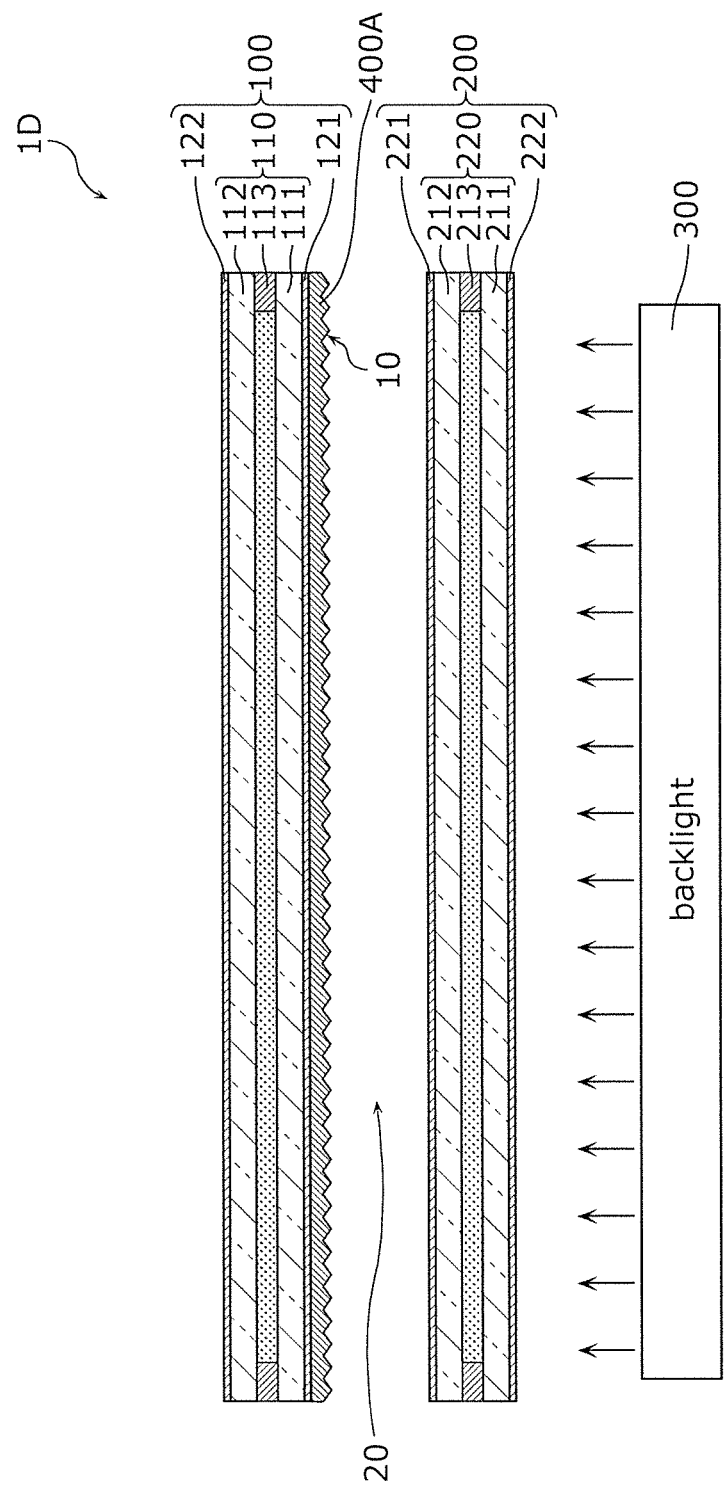
FIG. 9 is a sectional view illustrating a fourth variation of the liquid crystal display device of the first exemplary embodiment.

FIG. 9 is a sectional view illustrating liquid crystal display device 1D according to a fourth modification of the first exemplary embodiment;

Optical member 400 in which light diffusing material 411 is contained in base material layer 410 is used in liquid crystal display device 1 of FIG. 2. However, as illustrated in FIG. 9, optical member 400A in which the light diffusing material is not contained in base material layer 410 is used in liquid crystal display device 1D of the fourth modification.

That is, optical member 400A used in the fourth modification is an optical film that does not include the light diffusing layer having the internal haze value. Thus, although optical member 400A has the light diffusing property by irregularity structure 10 (external haze structure), optical member 400A does not have the light diffusing property by the light diffusing material (internal haze structure).

As described above, in liquid crystal display device 1D of FIG. 9, irregularity structure 10 is provided at the interface with air layer 20, so that the generation of the Newton's rings can be prevented. Thus, the degradation of the image quality of the image displayed on liquid crystal display device 1D can be prevented.

The fourth modification may be applied to optical member 400 of liquid crystal display devices 1A, 1B, and 1C in FIGS. 6, 7, and 8.

Second Exemplary Embodiment

Figure 10:
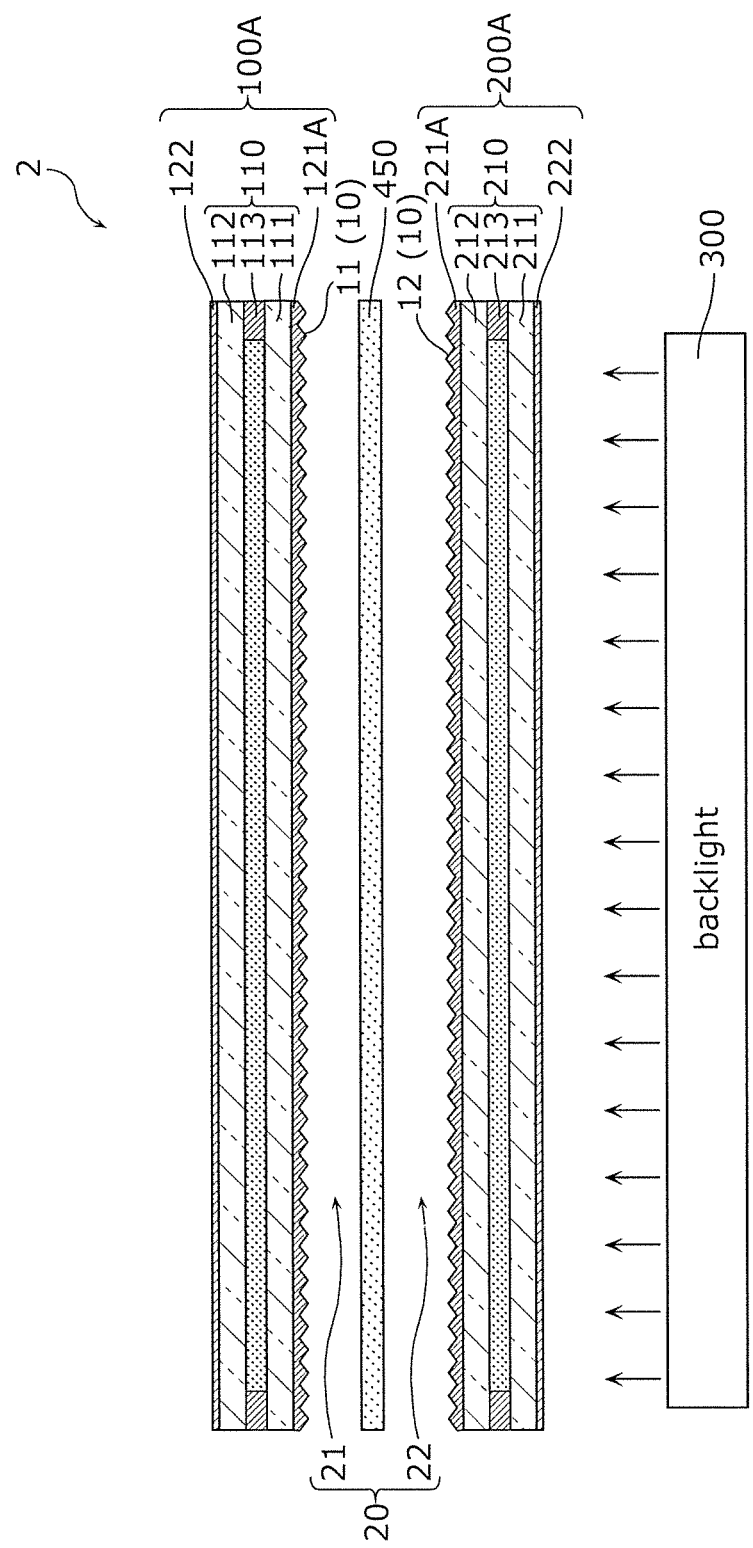
FIG. 10 is a sectional view illustrating a configuration of the liquid crystal display device of a second exemplary embodiment.

Liquid crystal display device 2 according to a second exemplary embodiment will be described below with reference to FIG. 10. FIG. 10 is a sectional view illustrating liquid crystal display device 2 of the second exemplary embodiment.

In liquid crystal display device 2 of the second exemplary embodiment, optical member 450 is disposed between first display panel 100 and second display panel 200 similarly to the first exemplary embodiment. However, unlike the first exemplary embodiment, optical member 450 the second exemplary embodiment is bonded to neither first display panel 100A nor second display panel 200A. That is, first display panel 100A, optical member 450, and second display panel 200A are separated from one another without being bonded together using a bonding member such as an adhesive sheet and a bonding agent. For example, optical member 450 is held together with first display panel 100A and second display panel 200A on a holding member holding first display panel 100A and second display panel 200A.

While one air layer 20 is provided between first display panel 100 and second display panel 200 in liquid crystal display device 1 of the first exemplary embodiment, two air layers of first air layer 21 existing between first display panel 100A and optical member 450 and second air layer 22 existing between second display panel 200A and optical member 450 are provided as air layer 20 in liquid crystal display device 2 of the second exemplary embodiment. That is, in the second exemplary embodiment, two interfaces exist between first display panel 100A and air layer 20 and between second display panel 200A and air layer 20.

In liquid crystal display device 2 of the second exemplary embodiment, irregularity structure 10 having a predetermined external haze value is provided at the interface of each of the two air layers of first air layer 21 and second air layer 22. Specifically, as illustrated in FIG. 10, irregularity structure 10 of the second exemplary embodiment includes first irregularity structure 11 provided at the interface of first air layer 21 and second irregularity structure 12 provided at the interface of second air layer 22.

Consequently, in the case where first display panel 100A, second display panel 200A, and optical member 450 are not bonded but stacked, the generation of the Newton's rings can be prevented even if first air layer 21 exists between first display panel 100A and optical member 450 while second air layer 22 exists between second display panel 200A and optical member 450. Thus, the degradation of the image quality of the image displayed on liquid crystal display device 2 can be prevented.

In liquid crystal display device 2 of the second exemplary embodiment, first display panel 100A and second display panel 200A are not bonded together. That is, first display panel 100A and second display panel 200A are stacked without using a bonding agent. Consequently, liquid crystal display device 2 can be manufactured at low cost.

Additionally, in liquid crystal display device 2 of the second exemplary embodiment, optical member 450 is bonded to neither first display panel 100A nor second display panel 200A. That is, optical member 450 is inserted between first display panel 100A and second display panel 200A without using a bonding agent. Consequently, liquid crystal display device 2 can be manufactured at a lower cost as compared with liquid crystal display device 1 of the first exemplary embodiment. Because optical member 450 is bonded to neither first display panel 100A nor second display panel 200A, a warp of optical member 450 or warps of first display panel 100A and second display panel 200A, which are caused by the difference in linear expansion coefficient when first display panel 100A and second display panel 200A are bonded to optical member 450, can be prevented. Thus, optical member 450 can be selected without concern for a difference in linear expansion coefficient between first display panel 100A and second display panel 200A. That is, a range of selection of optical member 450 can be widened, and optical member 450 suitable for the purpose can freely be selected.

In liquid crystal display device 2 of the second exemplary embodiment, first irregularity structure 11 is provided as the surface structure of the surface of optical member 450 of first display panel 100A or surface of optical member 450 on the side of first display panel 100A. Second irregularity structure 12 is provided as the surface structure of the surface of second display panel 200A on the side of optical member 450 or the surface of optical member 450 on the side of second display panel 200A. That is, first irregularity structure 11 is provided at the interface of first air layer 21 on the side of first display panel 100A, and second irregularity structure 12 is provided at the interface of second air layer 22 on the side of second display panel 200A. As an example, first display panel 100A including first irregularity structure 11 and second display panel 200A including second irregularity structure 12 are the liquid crystal display panel with AG function used in the first and second modifications of the first exemplary embodiment.

In this way, irregularity structure 10 can easily be provided at each interface of the two air layers of first air layer 21 and second air layer 22 by simply preparing first display panel 100A including first irregularity structure 11 and second display panel 200A including second irregularity structure 12.

In this case, similarly to the second modification of the first exemplary embodiment, first irregularity structure 11 can be provided as the surface structure of first polarizing plate 121A on the side of second display panel 200A in the pair of first polarizing plates 121A and 122. Similarly to the second modification of the first exemplary embodiment, second irregularity structure 12 is provided as the surface structure of second polarizing plate 221A on the side of first display panel 100A in the pair of second polarizing plates 221A and 222. As an example, the polarizing plate with AG function subjected to the AG treatment can be used as first polarizing plate 121A including first irregularity structure 11 and second polarizing plate 221A including second irregularity structure 12.

Consequently, first polarizing plate 121A including first irregularity structure 11 is bonded to first liquid crystal cell 110 while second polarizing plate 221A including second irregularity structure 12 is bonded to second liquid crystal cell 210, which allows irregularity structure 10 to be simply provided at each interface of the two air layers of first air layer 21 and second air layer 22.

In the second embodiment, similarly to optical member 400 of the first exemplary embodiment, optical member 450 diffuses the light transmitted through second display panel 200A from backlight 300. Specifically, optical member 450 is a sheet-shaped or film-shaped diffusion plate, and includes the base material layer in which light diffusing material is dispersed as the light diffusing layer having the predetermined internal haze value similarly to optical member 400 of the first exemplary embodiment.

Consequently, the moire generated when first display panel 100A and second display panel 200A are superimposed on each other is prevented similarly to the first exemplary embodiment, so that the degradation of the image quality of the image displayed on liquid crystal display device 2 can further be prevented.

Unlike the first exemplary embodiment, the irregularity structure having the external haze value is not formed in optical member 450. That is, both surfaces of optical member 450 are a smooth surface.

In liquid crystal display device 2 of the second exemplary embodiment, assuming that Ho1 is the external haze value of first irregularity structure 11, that Ho2 is the external haze value of second irregularity structure 12, and that Hi is the internal haze value of optical member 450, a relational expression of Ho2≤Ho1<Hi may be satisfied. That is, the internal haze value is maximized, and the external haze value is increased closer to the observer side.

In this case, the distance from the black matrix of second display panel 200A can widely be secured as the internal haze value and the external haze value are increased. For this reason, as the internal haze value and the external haze value are increased, the light transmitted through the black matrix of second display panel 200A is incident after sufficiently spreading, and the light transmitted through second display panel 200A can sufficiently be diffused. For example, preferably the external haze values of first irregularity structure 11 and second irregularity structure 12 are less than 50%, and the internal haze value is greater than or equal to 50%. As an example, the external haze values of first irregularity structure 11 and second irregularity structure 12 range from 20% to 25%, and the internal haze value is 80%. A relational expression of Ho2<Ho1<Hi2<Hi may be satisfied.

Consequently, the generation of the Newton's rings can be prevented while the generation of the moire is effectively prevented. Thus, both the prevention of the generation of the moire and the prevention of the generation of the Newton's rings can be achieved, so that high-quality liquid crystal display device 2 can be constructed.

Additionally, in liquid crystal display device 2 of the second exemplary embodiment, irregularity structure 10 is provided on both first display panel 100A and second display panel 200A, so that the surfaces of first display panel 100A and second display panel 200A can be prevented from being scratched during handling.

First Modification of Second Exemplary Embodiment

Figure 11:
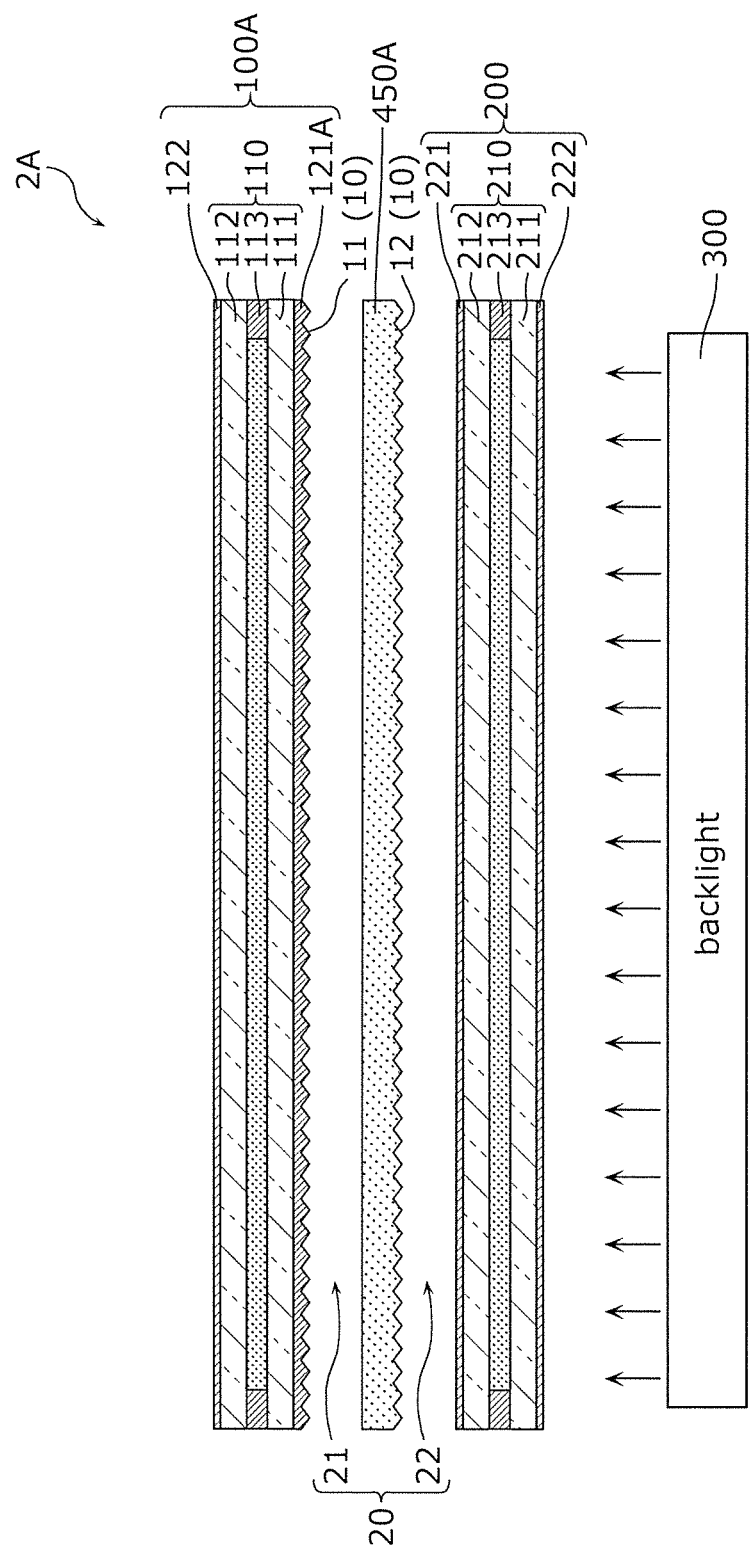
FIG. 11 is a sectional view illustrating a first variation of the liquid crystal display device of the second exemplary embodiment.

FIG. 11 is a sectional view illustrating liquid crystal display device 2A according to a first modification of the second exemplary embodiment;

In liquid crystal display device 2 of FIG. 10, second irregularity structure 12 is provided on second display panel 200A. However, the present disclosure is not limited to this configuration.

For example, as in liquid crystal display device 2A of FIG. 11, second irregularity structure 12 may be provided as the surface structure of the surface of optical member 450A on the side of second display panel 200A. That is, second irregularity structure 12 is provided at the interface of second air layer 22 on the side of optical member 450. Irregularity structure 10 is not provided in second display panel 200.

On the other hand, similarly to liquid crystal display device 2 in FIG. 10, first irregularity structure 11 is provided as the surface structure of the surface of first display panel 100A on the side of optical member 450A. Specifically, first irregularity structure 11 is provided as the surface structure of first polarizing plate 121A. That is, first irregularity structure 11 is provided at the interface of first air layer 21 on the side of first display panel 100A.

In this way, in liquid crystal display device 2A of FIG. 11, irregularity structure 10 having the predetermined external haze value is provided at each interface of the two air layers of first air layer 21 and second air layer 22. Consequently, the generation of the Newton's rings can be prevented similarly to liquid crystal display device 2 in FIG. 10. Thus, the degradation of the image quality of the image displayed on liquid crystal display device 2A can be prevented.

In FIG. 11, similarly to optical member 450, optical member 450A includes the base material layer in which the light diffusing material is dispersed as the light diffusing layer having the predetermined internal haze value. That is, optical member 450A has not only the light diffusing property by second irregularity structure 12 (external haze structure) but also the light diffusing property by the light diffusing material (internal haze structure).

Consequently, the generation of the Newton's rings can be prevented while the generation of the moire is effectively prevented.

In the first modification, assuming that Ho1 is the external haze value of first irregularity structure 11, that Ho2 is the external haze value of second irregularity structure 12, and that Hi is the internal haze value of optical member 450A, a relational expression of Ho2≤Ho1<Hi may be satisfied. A relational expression of Ho2<Ho1<Hi may be satisfied.

Second Modification of Second Exemplary Embodiment

Figure 12:
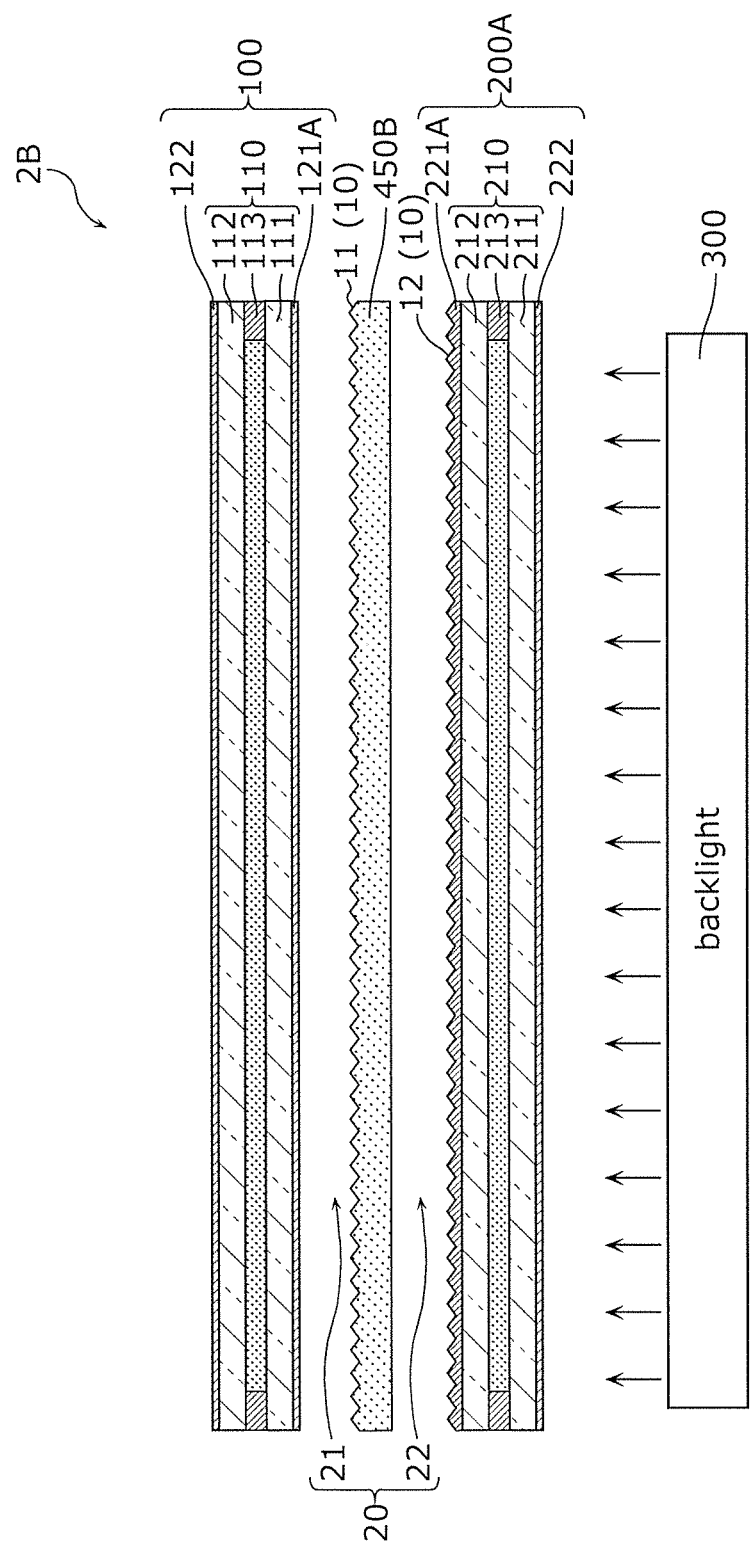
FIG. 12 is a sectional view illustrating a second variation of the liquid crystal display device of the second exemplary embodiment.

FIG. 12 is a sectional view illustrating liquid crystal display device 2B according to a second modification of the second exemplary embodiment.

In liquid crystal display device 2 of FIG. 10, first irregularity structure 11 is provided on first display panel 100A. However, the present disclosure is not limited to this configuration.

For example, as in liquid crystal display device 2B of FIG. 12, first irregularity structure 11 may be provided as the surface structure of the surface of optical member 450B on the side of first display panel 100A. That is, first irregularity structure 11 is provided at the interface of first air layer 21 on the side of first display panel 100. Irregularity structure 10 is not provided in first display panel 100.

On the other hand, similarly to liquid crystal display device 2 in FIG. 10, second irregularity structure 12 is provided as the surface structure of the surface of second display panel 200A on the side of optical member 450A. Specifically, second irregularity structure 12 is provided as the surface structure of second polarizing plate 221A. That is, second irregularity structure 12 is provided at the interface of second air layer 22 on the side of second display panel 200A.

In liquid crystal display device 2B of FIG. 12, similarly to liquid crystal display device 2 in FIG. 10, irregularity structure 10 having the predetermined external haze value is provided at each interface of the two air layers of first air layer 21 and second air layer 22. Consequently, the generation of the Newton's rings can be prevented similarly to liquid crystal display device 2 in FIG. 10. Thus, the degradation of the image quality of the image displayed on liquid crystal display device 2B can be prevented.

In FIG. 12, similarly to optical member 450, optical member 450B includes the base material layer in which the light diffusing material is dispersed as the light diffusing layer having the predetermined internal haze value. That is, optical member 450B not only has the light diffusing property by first irregularity structure 11 (external haze structure) but also has the light diffusing property by the light diffusing material (internal haze structure).

Consequently, the generation of the Newton's rings can be prevented while the generation of the moire is effectively prevented.

In the second modification, assuming that Ho1 is the external haze value of first irregularity structure 11, that Ho2 is the external haze value of second irregularity structure 12, and that Hi is the internal haze value of optical member 450B, a relational expression of Ho2≤Ho1<Hi may be satisfied. A relational expression of Ho2<Ho1<Hi may be satisfied.

Third Modification of Second Exemplary Embodiment

Figure 13:
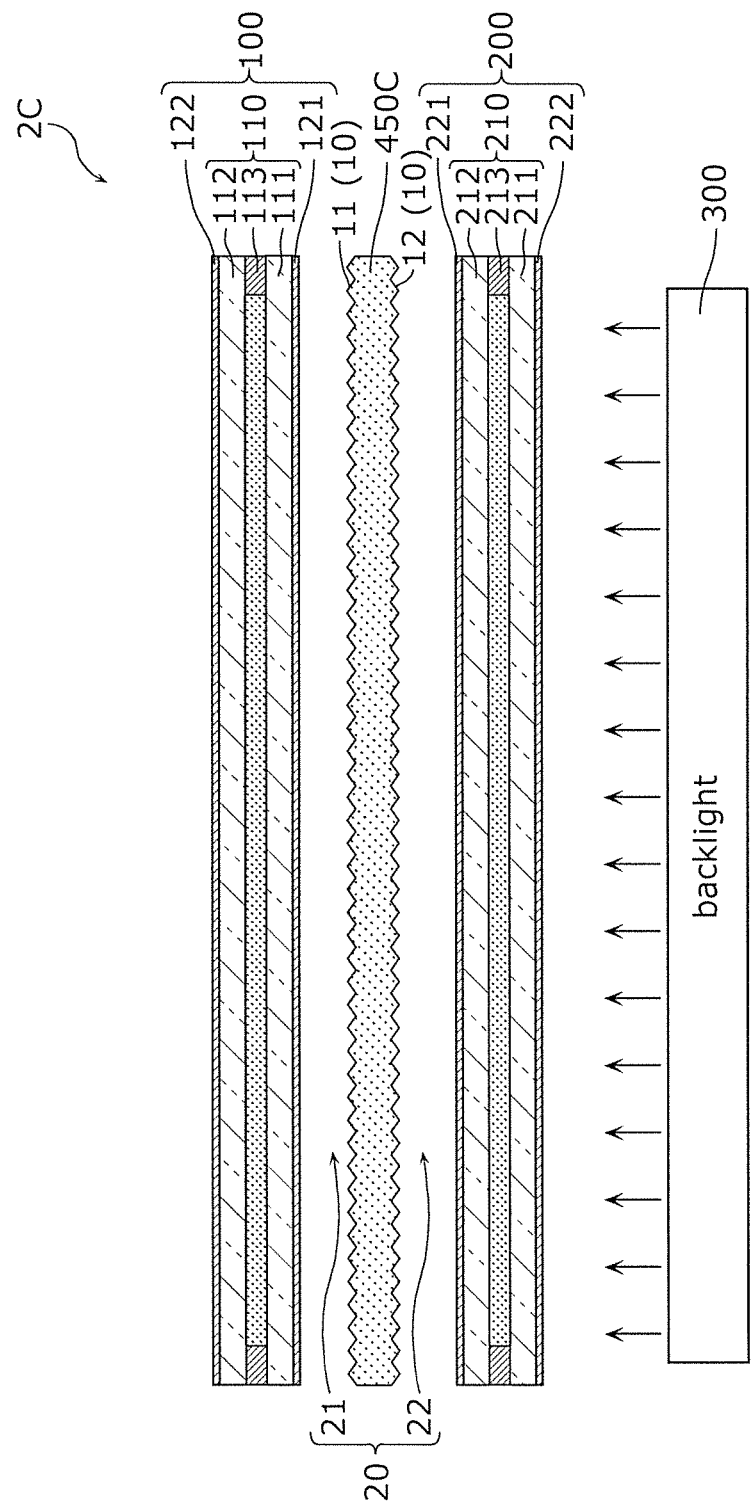
FIG. 13 is a sectional view illustrating a third variation of the liquid crystal display device of the second exemplary embodiment.

FIG. 13 is a sectional view illustrating liquid crystal display device 2C according to a third modification of the second exemplary embodiment;

In liquid crystal display device 2 of FIG. 10, first irregularity structure 11 is provided on first display panel 100A while second irregularity structure 12 is provided on second display panel 200A. However, the present disclosure is not limited to this configuration.

For example, as in liquid crystal display device 2C of FIG. 13, first irregularity structure 11 may be provided as the surface structure of the surface of optical member 450C on the side of first display panel 100 while second irregularity structure 12 is provided as the surface structure of the surface of optical member 450C on the side of second display panel 200. That is, first irregularity structure 11 is provided at the interface of first air layer 21 on the side of optical member 450C, and second irregularity structure 12 is provided at the interface of second air layer 22 on the side of optical member 450C. Irregularity structure 10 is provided in neither first display panel 100 nor second display panel 200.

In this way, in liquid crystal display device 2C of FIG. 13, irregularity structure 10 having the predetermined external haze value is provided at each interface of the two air layers of first air layer 21 and second air layer 22. Consequently, the generation of the Newton's rings can be prevented similarly to liquid crystal display device 2 in FIG. 10. Thus, the degradation of the image quality of the image displayed on liquid crystal display device 2C can be prevented.

In FIG. 13, similarly to optical member 450, optical member 450C includes the base material layer in which the light diffusing material is dispersed as the light diffusing layer having the predetermined internal haze value. That is, optical member 450C not only has the light diffusing property by first irregularity structure 11 and second irregularity structure 12 (external haze structure) but also has the light diffusing property by the light diffusing material (internal haze structure).

Consequently, the generation of the Newton's rings can be prevented while the generation of the moire is effectively prevented.

In the third modification, assuming that Ho1 is the external haze value of first irregularity structure 11, that Ho2 is the external haze value of second irregularity structure 12, and that Hi is the internal haze value of optical member 450C, a relational expression of Ho2≤Ho1<Hi may be satisfied. A relational expression of Ho2<Ho1<Hi may be satisfied.

Fourth Modification of Second Exemplary Embodiment

Figure 14:
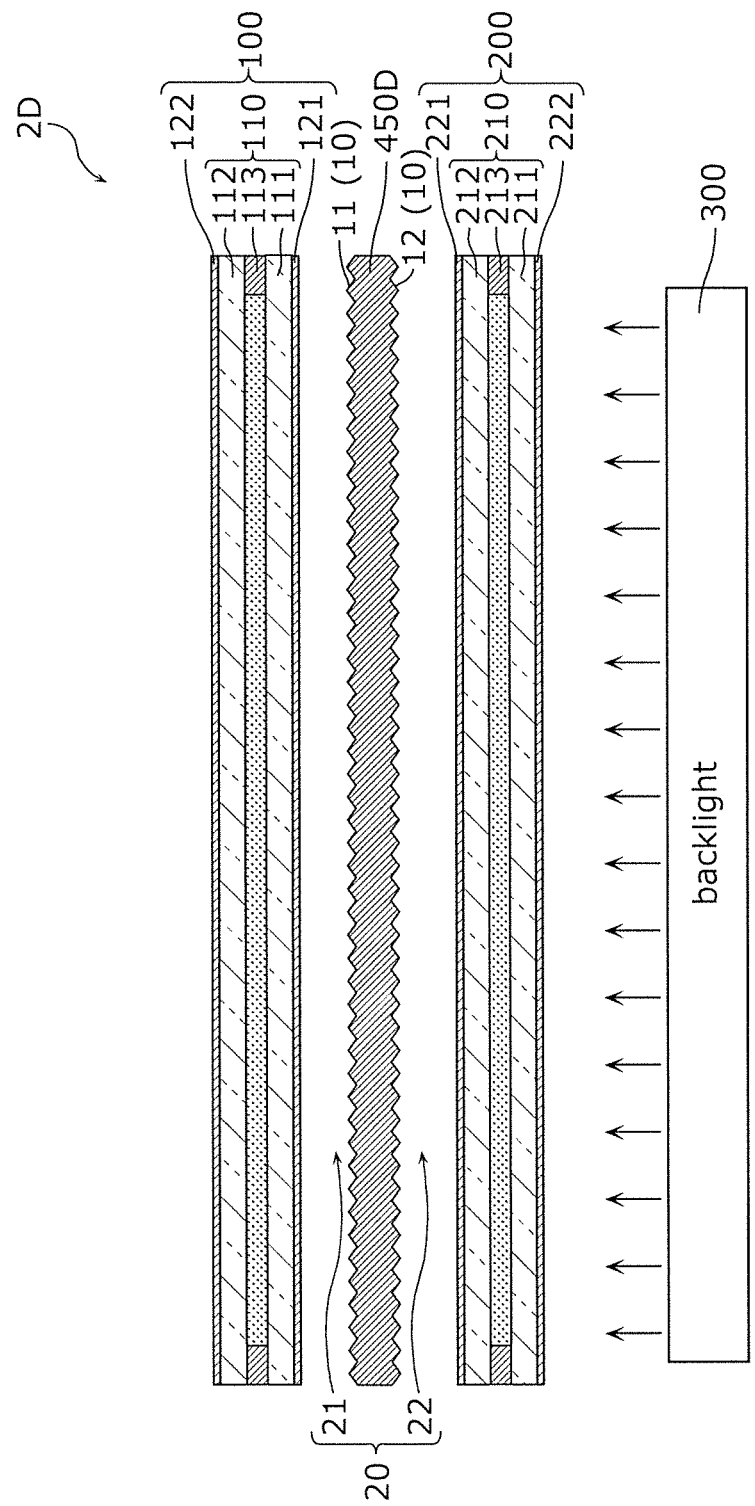
FIG. 14 is a sectional view illustrating a fourth variation of the liquid crystal display device of the second exemplary embodiment.

FIG. 14 is a sectional view illustrating liquid crystal display device 2D according to a fourth modification of the second exemplary embodiment.

Optical member 450C in which the light diffusing material is contained in the base material layer is used in liquid crystal display device 2C of FIG. 13. However, as illustrated in FIG. 14, optical member 450D in which the light diffusing material is not contained in the base material layer is used in liquid crystal display device 2D of the fourth modification.

That is, optical member 450D used in the fourth modification does not include the light diffusing layer having the internal haze value. Thus, although optical member 450D has the light diffusing property by first irregularity structure 11 and second irregularity structure 12 (external haze structure), optical member 450D does not have the light diffusing property by the light diffusing material (internal haze structure).

In this way, in liquid crystal display device 2D of FIG. 14, irregularity structure 10 having the predetermined external haze value is provided at each interface of the two air layers of first air layer 21 and second air layer 22. Consequently, the generation of the Newton's rings can be prevented similarly to liquid crystal display device 2C in FIG. 13. Thus, the degradation of the image quality of the image displayed on liquid crystal display device 2D can be prevented.

In liquid crystal display device 2D of the fourth modification, assuming that Ho1 is the external haze value of first irregularity structure 11 and that Ho2 is the external haze value of second irregularity structure 12, a relational expression of Ho2≤Ho1 may be satisfied. A relational expression of Ho2<Ho1 may be satisfied.

Consequently, the moire can effectively be prevented even if the diffusion layer (internal haze structure) is not included in optical member 450D.

In the fourth modification, one optical member 450D is inserted between first display panel 100 and second display panel 200. Alternatively, at least two optical members 450D may be inserted. In this case, from the viewpoint of preventing the moire, preferably the external haze value is increased as optical member 450D is closer to the observer side, and preferably the external haze value of optical member 450D arranged closest to the observer is maximized.

The fourth modification can also be applied to liquid crystal display devices 2, 2A, 2B, and 2C in FIGS. 10, 11, 12, and 13.

Third Exemplary Embodiment

Figure 15:
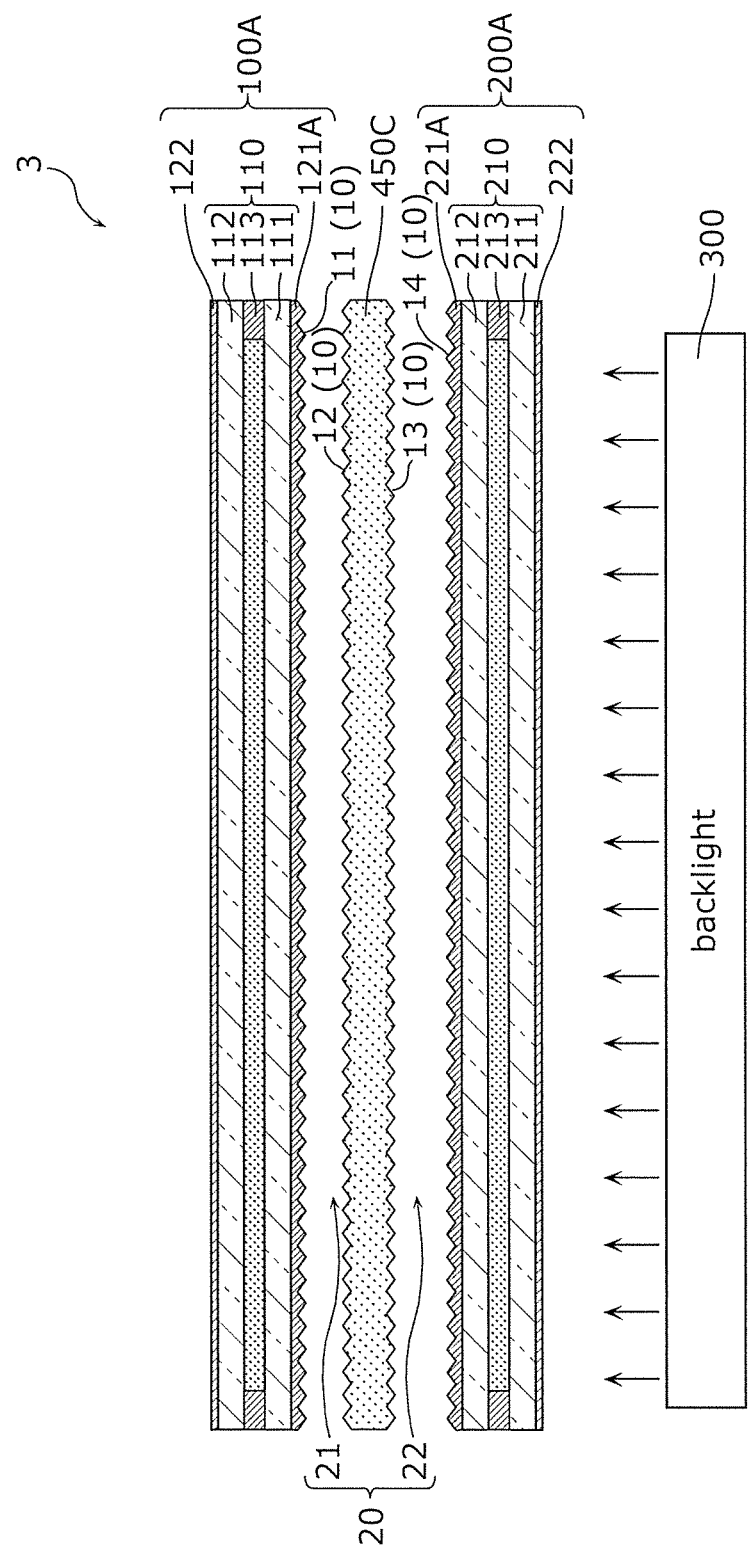
FIG. 15 is a sectional view illustrating a configuration of the liquid crystal display device of a third exemplary embodiment.

FIG. 15 is a sectional view illustrating liquid crystal display device 3 according to a third exemplary embodiment;

As illustrated in FIG. 15, in liquid crystal display device 3 of the third exemplary embodiment, optical member 400 is replaced with optical member 450C in FIG. 13 in liquid crystal display device 2 of FIG. 10.

In liquid crystal display devices 2 to 2D of FIGS. 10 to 14, irregularity structure 10 is provided at only one of the pair of interfaces in first air layer 21 and only one of the pair of interfaces in second air layer 22. However, in liquid crystal display device 3 of the third exemplary embodiment, irregularity structure 10 is provided on both of the pair of interfaces in first air layer 21 and the pair of interfaces in second air layer 22. That is, four external haze structures of first irregularity structure 11, second irregularity structure 12, third irregularity structure 13, and fourth irregularity structure 14 are provided as irregularity structure 10 in liquid crystal display device 3 of the third exemplary embodiment.

Specifically, irregularity structure 10 includes first irregularity structure 11 provided at the interface of first air layer 21 on the side of first display panel 100A, second irregularity structure 12 provided at the interface of first air layer 21 on the side of optical member 450C, third irregularity structure 13 provided at the interface of second air layer 22 on the side of optical member 450C, and fourth irregularity structure 14 provided at the interface of second air layer 22 on the side of second display panel 200A.

In the third exemplary embodiment, first irregularity structure 11 is irregularity structure 10 provided as the surface structure of first display panel 100A. Second irregularity structure 12 is irregularity structure 10 provided as the surface structure of the surface of optical member 450C on the side of first display panel 100A. Third irregularity structure 13 is irregularity structure 10 provided as the surface structure of the surface of optical member 450C on the side of second display panel 200A. Fourth irregularity structure 14 is irregularity structure 10 provided as the surface structure of second display panel 200A.

As an example, first display panel 100A and second display panel 200A are the liquid crystal display panel has an AG function having the surface structure subjected to the AG treatment as first irregularity structure 11 and fourth irregularity structure 14 similarly to liquid crystal display device 2 of the second exemplary embodiment.

As described above, liquid crystal display device 3 in the third exemplary embodiment includes one internal haze structure and four external haze structures.

Consequently, the generation of the Newton's rings can further be prevented as compared with liquid crystal display device 2 of the second exemplary embodiment while the generation of the moire is effectively prevented. Thus, the degradation of the image quality of the image displayed on liquid crystal display device 3 can further be prevented.

In the third exemplary embodiment, assuming that Ho1, Ho2, Ho3, and Ho4 are the external haze values of the four external haze structures of first irregularity structure 11, second irregularity structure 12, third irregularity structure 13, and fourth irregularity structure 14, which are provided as the external haze structure, respectively, and that Hi is the internal haze value of the internal haze structure of optical member 450C, a relational expression of Ho4≤Ho3≤Ho2≤Ho1<Hi may be satisfied. That is, the internal haze value is maximized, and the external haze value is increased closer to the observer side. This enables the generation of the moire and the generation of the Newton's rings to be effectively prevented. A relational expression of Ho4<Ho3<Ho2<Ho1<Hi may be satisfied.

Additionally, in liquid crystal display device 3 of the third exemplary embodiment, irregularity structure 10 is provided on both first display panel 100A and second display panel 200A similarly to liquid crystal display device 2 of the second exemplary embodiment, so that the surfaces of first display panel 100A and second display panel 200A can be prevented from being scratched during handling.

First Modification of Third Exemplary Embodiment

Figure 16:
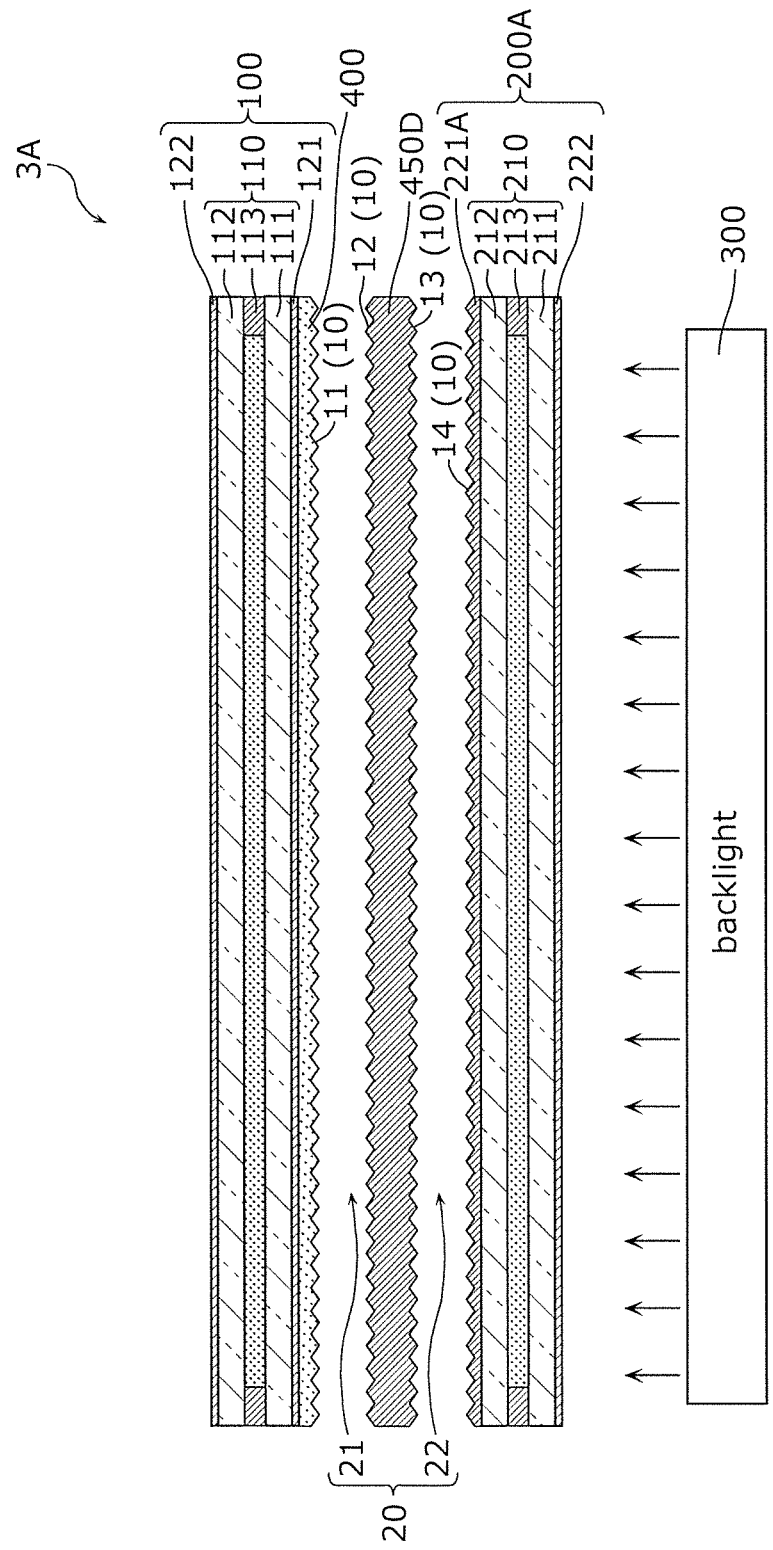
FIG. 16 is a sectional view illustrating a first variation of the liquid crystal display device of the third exemplary embodiment.

FIG. 16 is a sectional view illustrating liquid crystal display device 3A according to a first modification of the third exemplary embodiment.

As illustrated in FIG. 16, in liquid crystal display device 3A of the first modification, optical member 400 (optical film) is bonded to first display panel 100 while optical member 450C in which the light diffusing material is contained in the base material layer is replaced with optical member 450D in which the light diffusing material is not contained in the base material layer in liquid crystal display device 3 of FIG. 15. That is, optical member 450D used in the first modification has the light diffusing property by irregularity structure 10 (external haze structure), but does not have the light diffusing property by the light diffusing material (internal haze structure).

In liquid crystal display device 3A of the first modification, similarly to liquid crystal display device 3 of the third exemplary embodiment, irregularity structure 10 is provided at both the pair of interfaces in first air layer 21 and the pair of interfaces in second air layer 22. That is, in liquid crystal display device 3A of the first modification, irregularity structure 10 includes the four external haze structures of first irregularity structure 11 provided at the interface of first air layer 21 on the side of first display panel 100, second irregularity structure 12 provided at the interface of first air layer 21 on the side of optical member 450D, third irregularity structure 13 provided at the interface of second air layer 22 on the side of optical member 450D, and fourth irregularity structure 14 provided at the interface of second air layer 22 on the side of second display panel 200A.

However, in liquid crystal display device 3 of the third exemplary embodiment, first irregularity structure 11 is provided as the surface structure of first display panel 100A. On the other hand, in liquid crystal display device 3A of the first modification, first irregularity structure 11 is provided as the surface structure of optical member 400 bonded to first display panel 100.

Liquid crystal display device 3A of the first modification includes one internal haze structure similarly to liquid crystal display device 3 of the third exemplary embodiment.

However, in liquid crystal display device 3 of the third exemplary embodiment, optical member 450C disposed between first air layer 21 and second air layer 22 includes the internal haze structure. On the other hand, in liquid crystal display device 3A of the first modification, optical member 450D does not include the internal haze structure, but optical member 400 bonded to first display panel 100 includes the internal haze structure.

As described above, liquid crystal display device 3A of the first modification includes the one internal haze structure and the four external haze structures similarly to liquid crystal display device 3 of the third exemplary embodiment.

Consequently, the generation of the Newton's rings can further be prevented as compared with liquid crystal display device 2 of the second exemplary embodiment while the generation of the moire is effectively prevented. Thus, the degradation of the image quality of the image displayed on liquid crystal display device 3A can further be prevented.

In the first modification, assuming that Ho1, Ho2, Ho3, and Ho4 are the external haze values of the four external haze structures of first irregularity structure 11, second irregularity structure 12, third irregularity structure 13, and fourth irregularity structure 14, respectively, and that Hi is the internal haze value of the internal haze structure of optical member 400, a relational expression of Ho4≤Ho3≤Ho2≤Ho1<Hi may be satisfied similarly to the third exemplary embodiment. This enables the generation of the moire and the generation of the Newton's rings to be effectively prevented. A relational expression of Ho4<Ho3<Ho2<Ho1<Hi may be satisfied.

In liquid crystal display device 3A of the first modification, irregularity structure 10 is provided on both the sides of first display panel 100 and second display panel 200A. Consequently, the surfaces of first display panel 100 on which optical member 400 is provided and second display panel 200A can be prevented from being scratched during handling.

Second Modification of Third Exemplary Embodiment

Figure 17:
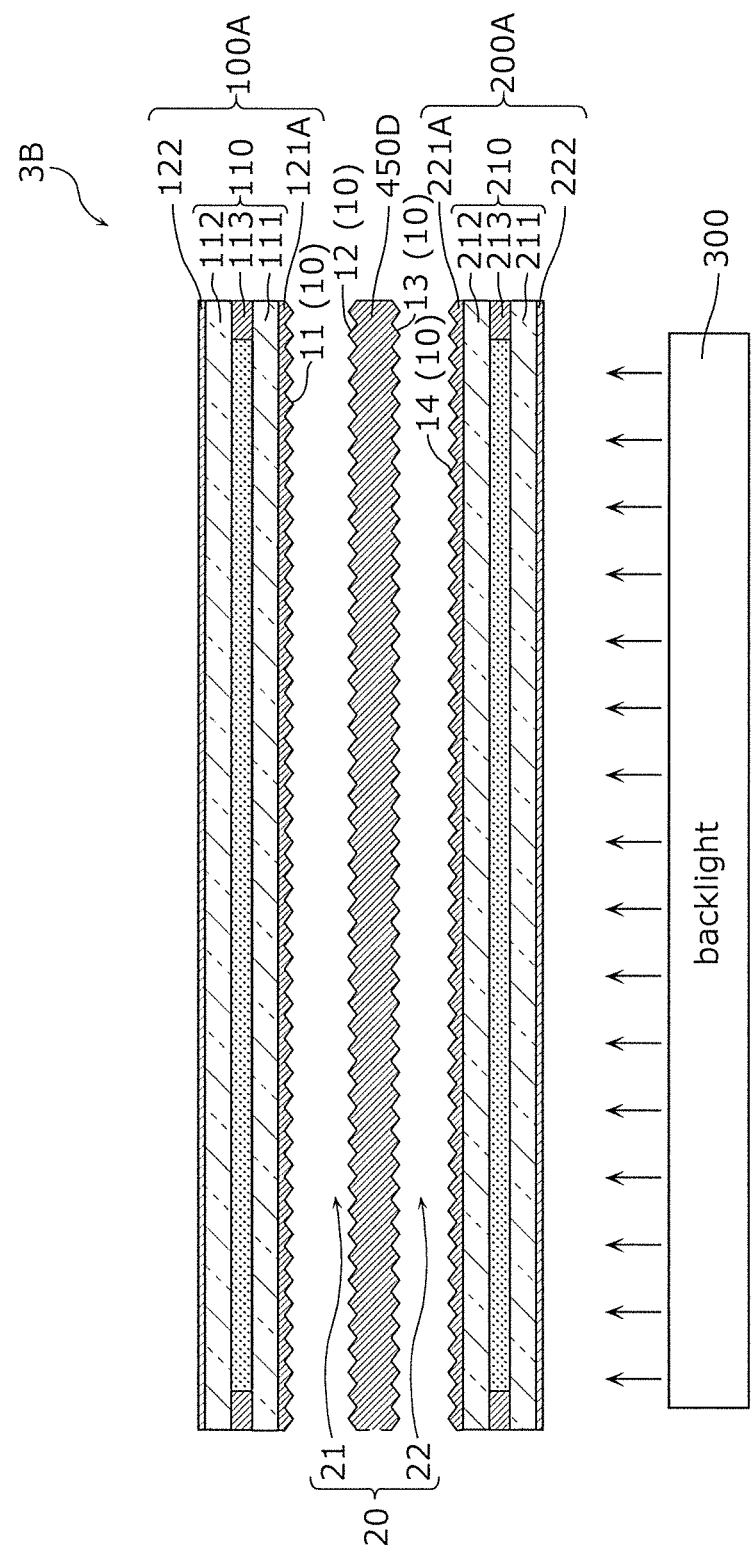
FIG. 17 is a sectional view illustrating a second variation of the liquid crystal display device of the third exemplary embodiment.

FIG. 17 is a sectional view illustrating liquid crystal display device 3B according to a second modification of the third exemplary embodiment.

Optical member 450C in which the light diffusing material is contained in the base material layer is used in liquid crystal display device 3 of FIG. 15. However, as illustrated in FIG. 17, optical member 450D in which the light diffusing material is not contained in the base material layer is used in liquid crystal display device 3B of the second modification similarly to the first modification of the third exemplary embodiment.

As described above, in liquid crystal display device 3B of the second modification, similarly to liquid crystal display device 3 of the third exemplary embodiment, irregularity structure 10 is provided at both the pair of interfaces in first air layer 21 and the pair of interfaces in second air layer 22. That is, in liquid crystal display device 3B of the second modification, irregularity structure 10 includes the four external haze structures of first irregularity structure 11 provided at the interface of first air layer 21 on the side of first display panel 100A, second irregularity structure 12 provided at the interface of first air layer 21 on the side of optical member 450D, third irregularity structure 13 provided at the interface of second air layer 22 on the side of optical member 450D, and fourth irregularity structure 14 provided at the interface of second air layer 22 on the side of second display panel 200A.

Consequently, the generation of the Newton's rings can further be prevented as compared with liquid crystal display device 2 of the second exemplary embodiment while the generation of the moire is effectively prevented. Thus, the degradation of the image quality of the image displayed on liquid crystal display device 3B can further be prevented.

In the second modification, assuming that Ho1, Ho2, Ho3, and Ho4 are the external haze values of the four external haze structures of first irregularity structure 11, second irregularity structure 12, third irregularity structure 13, and fourth irregularity structure 14, respectively, a relational expression of Ho4≤Ho3≤Ho2≤Ho1 may be satisfied similarly to the third exemplary embodiment. Consequently, even if the diffusion layer (internal haze structure) is not included in optical member 450D, the generation of the Newton's rings can be prevented while the moire is effectively prevented. A relational expression of Ho4<Ho3<Ho2<Ho1 may be satisfied.

In liquid crystal display device 3B of the second modification, irregularity structure 10 is provided on both first display panel 100A and second display panel 200A. Consequently, the surfaces of first display panel 100A and second display panel 200A can be prevented from being scratched during handling.

In the second modification, one optical member 450D is inserted between first display panel 100A and second display panel 200A. Alternatively, at least two optical members 450D may be inserted. In this case, from the viewpoint of preventing the moire, preferably the external haze value is increased as optical member 450D is closer to the observer side, and preferably the external haze value of optical member 450D arranged closest to the observer is maximized.

Modifications

The liquid crystal display device of the present disclosure has been described above based on the first to third exemplary embodiments. However, the present disclosure is not limited to the first to third exemplary embodiments.

For example, in the first exemplary embodiment, as illustrated in FIGS. 2 and 6, first display panel 100 and second display panel 200 are disposed with air layer 20 interposed therebetween while separated from each other as a whole by way of example. However, the present disclosure is not limited to this configuration. First display panel 100 and second display panel 200 may be partially in contact with each other as long as the air layer exists partially between first display panel 100 and second display panel 200. In this case, even if slight distortion exists in first display panel 100 and second display panel 200, the slight air layer is partly unevenly distributed when first display panel 100 and second display panel 200 are superimposed on each other. That is, even in the case where the air layer does not exist between first display panel 100 and second display panel 200 at first glance, sometimes the slight air layer exists between first display panel 100 and second display panel 200. Even in such a case, the Newton's rings are generated. Consequently, the generation of the Newton's rings can be prevented by providing irregularity structure 10 at the interface with the air layer existing between first display panel 100 and second display panel 200.

The two display panels are used in the first, second, and third exemplary embodiments. However, the present disclosure is not limited to this configuration. For example, at least three display panels may be used. In this case, at least one irregularity structure is preferably provided at each interface of the plurality of air layers existing between two adjacent display panels.

Those skilled in the art will readily appreciate that many modifications are possible in the above exemplary embodiment and variations without materially departing from the novel teachings and advantages of the present disclosure. Accordingly, all such modifications are intended to be included within the scope of the present disclosure.

What is claimed is:

1. A liquid crystal display device comprising:
a first display panel including a first liquid crystal cell;
a backlight opposed to the first display panel;
a second display panel including a second liquid crystal cell and disposed between the first display panel and the backlight; and
an optical member disposed between the first display panel and the second display panel, the optical member being bonded to a surface of the first display panel on a side of the second display panel and spaced apart from the second display panel,
wherein an irregularity structure is provided as a surface structure of the surface of the second display panel on the side of the first display panel,
wherein another irregularity structure is provided as a surface structure of the optical member on the side of the second display panel, the optical member includes a light diffusing layer having an internal haze value, and
wherein a relational expression $Ho2 \leq Ho1 < Hi$ is satisfied, in which $Ho1$ is a first external haze value that is a haze value of the another irregularity structure, $Ho2$ is a second external haze value that is a haze value of the irregularity structure, and $Hi$ is the internal haze value of the optical member.

2. The liquid crystal display device according to claim 1, wherein the external haze value is less than 50%, and the internal haze value is greater than or equal to 50%.

* * * * *